United States Patent
He et al.

(10) Patent No.: US 10,448,391 B2
(45) Date of Patent: Oct. 15, 2019

(54) METHOD AND DEVICE FOR TRANSMISSION AND RECEPTION OF TIME-FREQUENCY RESOURCES

(71) Applicant: Telefonaktiebolaget LM Ericsson (publ), Stockholm (SE)

(72) Inventors: Ning He, Sollentuna (SE); Johan Axnäs, Solna (SE); Robert Baldemair, Solna (SE); Stefan Parkvall, Bromma (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 229 days.

(21) Appl. No.: 15/523,164

(22) PCT Filed: May 29, 2015

(86) PCT No.: PCT/SE2015/050629
§ 371 (c)(1),
(2) Date: Apr. 28, 2017

(87) PCT Pub. No.: WO2016/085380
PCT Pub. Date: Jun. 2, 2016

(65) Prior Publication Data
US 2017/0332376 A1    Nov. 16, 2017

Related U.S. Application Data

(60) Provisional application No. 62/083,344, filed on Nov. 24, 2014, provisional application No. 62/083,334, filed on Nov. 24, 2014.

(51) Int. Cl.
*H04J 3/00* (2006.01)
*H04W 72/04* (2009.01)
(Continued)

(52) U.S. Cl.
CPC ....... *H04W 72/0446* (2013.01); *H04L 5/0001* (2013.01); *H04L 5/0053* (2013.01);
(Continued)

(58) Field of Classification Search
None
See application file for complete search history.

(56) References Cited

U.S. PATENT DOCUMENTS

2008/0170633 A1    7/2008  Karino
2010/0027512 A1    2/2010  Kishiyama et al.
(Continued)

FOREIGN PATENT DOCUMENTS

EP    2498419 A2    12/2012
GB    2424805 A     4/2006
(Continued)

OTHER PUBLICATIONS

3GPP TSG RAN WG1 #51, Texas Instruments, Uplink Reference Signals in Support of High-Speed UEs, Agenda Item 6.2.2, Nov. 5-9, 2007, Jeju, Korea, R1-074678.

*Primary Examiner* — Phirin Sam
(74) *Attorney, Agent, or Firm* — Patent Portfolio Builders, PLLC

(57) ABSTRACT

A method for performing transmission or reception by a first communication node (511) in at least one of: a first set of time-frequency resources (1201) and a second set of time-frequency resources (1202) in a frame (1200). The first and the second set of time-frequency resources (1201, 1202) are reserved for communication of reference signal and/or control information in a pre-arranged direction of: transmission and reception to or from one or more second communication nodes (512). The first communication node determines (1301) that the direction of communication of at least one of the first and second set is to be switched for at least one
(Continued)

frame (1200). The first communication node also performs (1306) transmission or reception of control information in at least one of the first and second set of time-frequency resources (1202) according to the determined switched direction to or from, one or more third communication nodes (513).

27 Claims, 25 Drawing Sheets

(51) Int. Cl.

| | | |
|---|---|---|
| *H04W 92/20* | (2009.01) | |
| *H04L 5/00* | (2006.01) | |
| *H04L 5/14* | (2006.01) | |
| *H04L 5/18* | (2006.01) | |
| *H04W 52/00* | (2009.01) | |
| *H04W 16/10* | (2009.01) | |
| *H04L 27/26* | (2006.01) | |

(52) U.S. Cl.
CPC ............... *H04L 5/143* (2013.01); *H04L 5/18* (2013.01); *H04W 52/00* (2013.01); *H04W 92/20* (2013.01); *H04L 5/0028* (2013.01); *H04L 27/2601* (2013.01); *H04W 16/10* (2013.01); *H04W 72/0453* (2013.01)

(56) References Cited

U.S. PATENT DOCUMENTS

| | | | |
|---|---|---|---|
| 2010/0118864 A1* | 5/2010 | Kubler | G06F 1/1626 370/352 |
| 2010/0309775 A1 | 12/2010 | Muharemovic et al. | |
| 2011/0310835 A1 | 12/2011 | Cho et al. | |
| 2012/0087393 A1 | 4/2012 | Jeong et al. | |
| 2012/0287874 A1 | 11/2012 | Oketani | |
| 2013/0148628 A1* | 6/2013 | Das | H04W 36/14 370/331 |
| 2013/0163532 A1* | 6/2013 | Anderson | H04W 72/04 370/329 |
| 2013/0242882 A1* | 9/2013 | Blankenship | H04W 72/042 370/329 |
| 2013/0279614 A1 | 10/2013 | Walton et al. | |
| 2014/0003544 A1 | 1/2014 | Oketani et al. | |
| 2014/0106740 A1 | 4/2014 | Zhou et al. | |
| 2014/0153420 A1 | 6/2014 | Garin et al. | |
| 2015/0139017 A1* | 5/2015 | Kim | H04W 16/18 370/252 |
| 2015/0188679 A1* | 7/2015 | Lee | H04J 13/16 370/330 |
| 2016/0065333 A1* | 3/2016 | Blankenship | H04W 72/042 370/329 |
| 2016/0381601 A1* | 12/2016 | Goldhamer | H04W 72/0453 370/280 |
| 2018/0124702 A1* | 5/2018 | Jung | H04W 36/03 |
| 2018/0279381 A1* | 9/2018 | Tabet | H04J 13/0062 |
| 2018/0376466 A1* | 12/2018 | Shao | H04L 1/1893 |

FOREIGN PATENT DOCUMENTS

| | | |
|---|---|---|
| WO | 2008007375 A2 | 1/2008 |
| WO | 2009014764 A1 | 1/2009 |
| WO | 2013162326 A1 | 10/2013 |
| WO | 2014121833 A1 | 8/2014 |

* cited by examiner

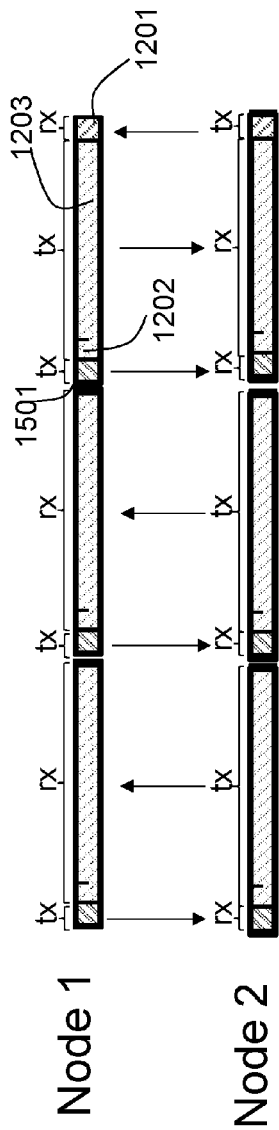
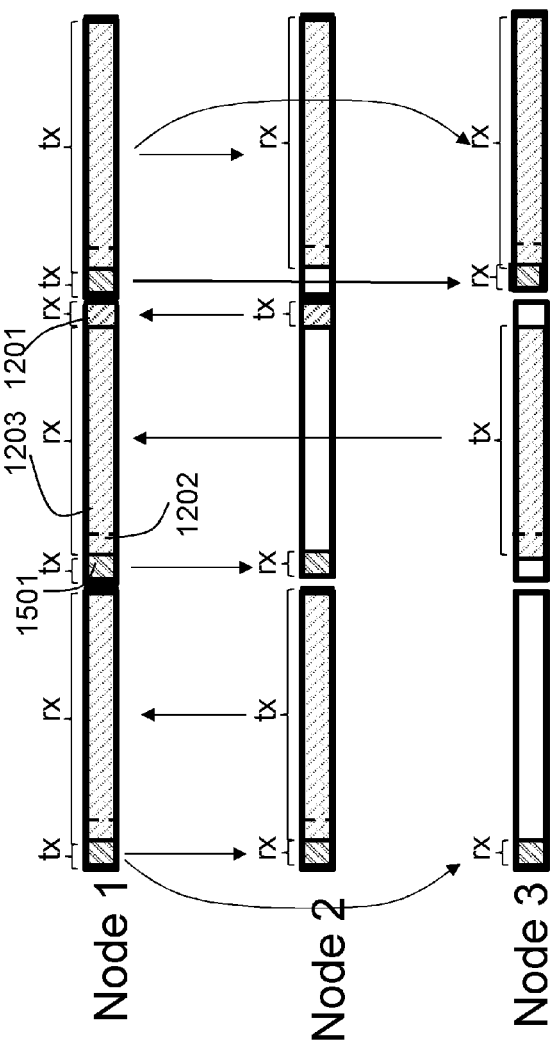
Figure 19
Figure 20

METHOD AND DEVICE FOR TRANSMISSION AND RECEPTION OF TIME-FREQUENCY RESOURCES

TECHNICAL FIELD

Embodiments herein relate to a method and a first communication node for performing any one of transmission and reception in at least one of: a first set of time-frequency resources in a frame of time-frequency resources, and a second set of time-frequency resources in the frame. Embodiments herein further relate to computer programs and computer-readable storage mediums, having stored thereon the computer programs to carry out the method.

BACKGROUND

Communication devices such as wireless devices are also known as e.g. User Equipments (UE), mobile terminals, wireless terminals, terminals and/or mobile stations. Wireless devices are enabled to communicate wirelessly in a communications network or wireless communication system, sometimes also referred to as a radio system or networks. The communication may be performed e.g. between two wireless devices, between a wireless device and a regular telephone and/or between a wireless device and a server via a Radio Access Network (RAN) and possibly one or more core networks, comprised within the communications network.

Wireless devices may further be referred to as mobile telephones, cellular telephones, laptops, or surf plates with wireless capability, just to mention some further examples. The terminals in the present context may be, for example, portable, pocket-storable, hand-held, computer-comprised, or vehicle-mounted mobile devices, enabled to communicate voice and/or data, via the RAN, with another entity, such as another terminal or a server.

The communications network may cover a geographical area which may be divided into cell areas, wherein each cell area being served by an access node such as a base station or network node, e.g. a Radio Base Station (RBS), which sometimes may be referred to as e.g. "eNB", "eNodeB", "NodeB", "B node", or BTS (Base Transceiver Station), depending on the technology and terminology used. The base stations may be of different classes such as e.g. macro eNodeB, home eNodeB or pico base station, based on transmission power and thereby also cell size. A cell is the geographical area where radio coverage is provided by the base station at a base station site. One base station, situated on the base station site, may serve one or several cells. Further, each base station may support one or several communication technologies. The base stations communicate over the air interface operating on radio frequencies with the terminals within range of the base stations. In the context of this disclosure, the expression Downlink (DL) is used for the transmission path from the base station to the mobile station. The expression Uplink (UL) is used for the transmission path in the opposite direction i.e. from the mobile station to the base station.

A Universal Mobile Telecommunications System (UMTS) is a third generation mobile communication system, which evolved from the second generation (2G) Global System for Mobile Communications (GSM). The UMTS Terrestrial RAN (UTRAN), is essentially a RAN using Wideband Code Division Multiple Access (WCDMA), and/ or High Speed Packet Access (HSPA), for UEs. In a forum known as the Third Generation Partnership Project (3GPP), telecommunications suppliers propose and agree upon standards for third generation networks and UTRAN specifically, and investigate enhanced data rate and radio capacity. In some versions of the RAN as e.g. in UMTS, several base stations may be connected, e.g., by landlines or microwave, to a controller node, such as a Radio Network Controller (RNC), or a Base Station Controller (BSC), which supervises and coordinates various activities of the plural base stations/network nodes connected thereto. The RNCs may be typically connected to one or more core networks.

Specifications for the Evolved Packet System (EPS), have been completed within the 3GPP and this work continues in the coming 3GPP releases. The EPS comprises the Evolved Universal Terrestrial Radio Access Network (E-UTRAN), also known as the Long Term Evolution (LTE) radio access, and the Evolved Packet Core (EPC), also known as System Architecture Evolution (SAE), core network. E-UTRAN/ LTE is a variant of a 3GPP radio access technology wherein the RBS nodes, which may be referred to as base stations, eNodeBs or even eNBs, may be directly connected to one or more core networks, e.g., the EPC core network, rather than to RNCs. In general, in E-UTRAN/LTE, the functions of an RNC are distributed between the RBS nodes, e.g. eNodeBs in LTE, and the core network. As such, the RAN of an EPS has an essentially flat architecture comprising RBS nodes without reporting to RNCs. 3GPP LTE radio access standard has been written in order to support high bitrates and low latency both for UL and DL traffic. All data transmission in LTE is controlled by the RBS.

Communications such as transmissions in radio communication systems are often organized in terms of frames, or sometimes subframes, e.g. in LTE, where each frame is a group of communication resources, e.g., radio time and frequency resources, that may comprise both, a control field and a payload data field, or multiple fields of the respective types. A field is understood herein to refer to a set of time and frequency resources, also referred to herein as time-frequency resources. The time-frequency resources corresponding to a field may be contiguous in the time and frequency dimensions. The control field may, e.g., comprise information about how the data part of the frame is encoded and modulated. The control field may also be used for receiving feedback information in the reverse link direction, i.e., from the receiver of the data, e.g., for receiving ACKnowledgement/Negative ACKnowledgement (ACK/ NACK) or channel state information reports.

In the wireless communication networks, such as, e.g. UMTS and LTE, both Frequency Division Duplex (FDD), with paired spectrum, and Time Division Duplex (TDD), with un-paired spectrum, may be specified to implement two ways communication with different physical layer frame structures.

An FDD network with symmetric bandwidth in UL and DL, which may be the case in existing systems such as UMTS FDD and LTE FDD, is not spectral efficient when the data traffic volumes in the two directions are not symmetric. The LTE TDD specifies some UL/DL dynamic to increase the spectral efficiency.

In wireless communication networks, a full duplex system is envisioned which may, for example, increase spectral efficiency, decrease latency for un-paired spectrum, and simplify signaling structure of relay networking. However, the existing IEEE 802.11 standards specify only a TDD physical layer frame structure with different frame format to suit the need of data traffic and adapt to carrier frequency.

Half-Duplex

In many radio communication systems, communication nodes may be only capable of half-duplex communication, i.e., a network node, e.g., an Access Node (AN) or a UE, may not both transmit and receive at the same time, at least not on the same frequency band. The main reason for such a limitation is that a network node that is transmitting may saturate its own analog receiving circuitry due to overhearing between transmit and receive antennas.

An implication of this is that data may only be communicated, e.g., transmitted, in one link direction at a time. However, even for one-directional data communication, there may be, as explained above, normally a need for regular communications of control information in both link directions, implying that in half-duplex communications, it may be useful to have two fields for control information in every frame, one for one link direction, and one for the reverse direction. Two fields may be useful also in full-duplex systems, but for other reasons. The two directions of a link will henceforth be referred to as tx/rx directions, or sometimes the two duplex directions. In other words, any given communication node may use one of the fields for transmission (tx) and the other field for reception (rx). The link direction may also be referred to herein as a direction of communication.

Communication as used herein, refers to one of transmission or reception, which may be also referred to collectively as "transmission", such as a transmission of data or a transmission of control information.

Frame Structure

Examples of frame structures that may be used in a wireless communication network are illustrated in FIG. 1 and FIG. 2. In FIG. 1, a frame structure is disclosed for a minimum subframe or frame unit. The frame comprises at least one control field, i.e. field or set of time-frequency resources to be used for reference signal information and/or control information, which comprises at least one control symbol to be used for transmission or reception. Also, the frame comprises at least one data field for data transmission or reception, i.e. field or set of time-frequency resources to be used for payload data. These are illustrated by the dotted field and the data field in FIG. 1. Here, the control field may be configured to use larger subcarrier spacing and/or zero-padding OFDM to lower overhead for the control field.

According to another example illustrated as a schematic diagram in FIG. 2, cf. also "Time-division duplexing", WO 2014/121833 A1 (PCT/EP2013/052376), a possible TDD frame structure with three sets of time-frequency resources in a minimum subframe or frame unit and its link-direction assignments is described, in which two sets of time-frequency resources are configured to transmit or receive control information, such as, reference signal information and/or feedback about received transmissions and scheduling information. Here, the other time-frequency resources may be configured for data transmission or reception, which e.g. may be at least 5 times larger than the sum for the other two smaller time-frequency resources. These are illustrated by the dashed control fields and the data field in FIG. 2.

In the two examples above, a frame structure for both FDD and TDD is described wherein the control field is time isolated from the data field and these fields may be controlled to transmit or receive independently, as shown in FIGS. 1 and 2. However, in these examples, two control symbols of the time-frequency resources are reserved for control information. FIGS. 1 and 2 may be OFDM based frame structures.

Any two communication nodes communicating may in principle arbitrarily select which of the two control fields may be used for tx and which for rx, see left and right panels of FIG. 2. However, such arbitrariness may require complicated negotiation procedures and hence it is often more practical to have a general rule for the system, e.g., that one of the fields is always used for DL communication, i.e., tx by ANs, whereas the other field is always used for UL communication, i.e., tx by UEs, see the illustration in FIG. 3 for a schematic diagram of other possible frame structures and respective link-direction assignments. Note also that frames on different links in the system may preferably be time-aligned, partly because this may enable communication nodes to more freely and efficiently change communication partner, that is node, from one frame to another, without waiting for the other communication link to finish its frame.

Fields may, in most transmission systems, be further divided into smaller units, e.g., in Orthogonal Frequency-Division Multiplexing (OFDM) systems, the fields may be further divided into one or more OFDM symbols. A similar principle holds for many other types of systems than OFDM, e.g., for many systems based on multi-carrier or pre-coded multi-carrier such as Filter-Bank Multi-Carrier (FBMC), Discrete Fourier Transform (DFT)-spread OFDM, etc. As a general term, such smaller units may be referred to herein as symbols. Some fields may consist of only a single symbol.

Other Signals and Fields in and Between Frames

Switching of tx/rx direction may take some time, and therefore, may require an extra guard period between adjacent symbols that belong to fields with different duplex direction. Moreover, it should be noted that within the three fields, there may typically also be other signals interspersed, e.g., reference signals, or pilot signals, to allow the receiver to perform channel estimation. For simplicity, guard periods or other signals are not shown in these figures.

Self-Backhauling

In the case of radio communication systems with very dense deployment of ANs, as envisioned in particular for systems operating at millimeter-Wave (mmW) frequencies, it may be difficult and costly to provide a wired backhaul connection, that is, a connection with the core network or Internet, to all ANs in the system. One option is to use wireless backhaul, i.e., have one AN with wired connection, henceforth referred to herein as Aggregation Node, or AgN, that forwards data to the other ANs wirelessly over a route, see illustration of a network using wireless self-backhauling in FIG. 4. In the more general case, the routes may form a more complicated pattern, e.g. a route tree. A particularly attractive solution is to use wireless self-backhauling, i.e., use the same frequency spectrum for access links and backhaul links, which avoids the need for multiple radio units in each communication node. Note that in such a network, not only user data may have to be forwarded over the backhaul links, but also control signaling for, e.g., radio resource coordination between ANs, e.g., allocation of time-frequency radio resources and scheduling on access links, or for setting up routes, may have to be performed wirelessly.

Modulation Schemes

OFDM, as a Multi-Carrier Modulation (MCM) scheme may be widely used in wireless communication systems and broadcasting systems, such as, e.g. IEEE 802.11 a/g/n, LTE DL, Digital Video Broadcasting (DVB), etc. . . . . This may enable an efficient implementation and simple transmission and equalization scheme over severe propagation channel conditions, such as, e.g. frequency selectivity. One of the disadvantages of MCM compared to single carrier transmission may be the high peak-to-average-power ratio (PAPR)

resulting in higher requirement on the radio frequency hardware (RF HW). To enable low PAPR transmission for wireless devices, a single carrier scheme called DFT-spread OFDM is standardized in LTE UL and as a transmission mode in some of the IEEE 802.11 standards. FIG. 5 is a schematic diagram showing two examples for single carrier localized DFT-spread OFDM. In the Figure, the arrows represent subcarriers wherein signals are being transmitted. The zeros represent that no signals are transmitted in those subcarriers. Thus, the size of the DFT boxes differs, depending on the different number of subcarriers to be transmitted. The bottom drawing shows all subcarriers are used for the transmitter. The top drawing shows only part of the subcarriers are used for the transmitter. Inverse Discrete Fourier Transform is represented as IDFT. FIG. 6 is a similar schematic diagram showing examples of clustered DFT-spread OFDM. A cluster may be one kind of signals, e.g. reference signals may be one kind, control information may be another. FIG. 7 is a similar schematic diagram showing examples of interleaved DFT-spread OFDM, wherein the solid and dashed arrows represent two different clusters.

Furthermore, to also have some flexibility at the same time as keeping a low PAPR property, interleaved—Frequency Division Multiple Access (FDMA) has been proposed as a transmission scheme. FIG. 8 is a schematic diagram showing examples of a regular (left) and a non-regular (right) interleaved FDM. FIG. 8 shows two bars, comprised of boxes with different patterns. Each of the boxes represents a different subcarrier, and the patterns indicate signals of the same kind, e.g., the downward-diagonal pattern represents control information and the upward-diagonal pattern represents reference signals. The left bar represents two kinds of signals are interleaved evenly, and the right bar illustrates an uneven distribution.

To enable gigabit data communication, one way is to use very wideband spectrum in high frequency bands and high gain beamforming with many antenna elements. To keep the HW cost reasonably low, a single-carrier modulation scheme may be used so that the PAPR is kept low and combined with the use of analogue beamforming with a few digital transceiver chains. However, single carrier modulation schemes have a limited flexibility for a combination of multi-user access, self-backhauling and very high-gain beamforming. These are normally considered important issues when considering a future wireless communication networks, e.g. a 5G standard. This is because in such a system, the control information signals may need to be transmitted and received among multiple nodes in different directions.

Also communication networks such as those with very dense deployments of communication nodes, may require exchange of control information among a number of communication nodes, or even all of them, within a certain time period, e.g., a frame. However, current frame structures do not provide support for such communication.

SUMMARY

It is therefore an object of embodiments herein to improve the performance of a communications network by providing improved methods of performing any one of transmission and reception of control information. It is a further particular object of embodiments herein to improve the flexibility and spectral efficiency of transmission resources in a wireless communication network.

According to a first aspect of embodiments herein, the object is achieved by a method performed by a first communication node. The method is for performing any one of transmission and reception in at least one of: a first set of time-frequency resources in a frame of time-frequency resources, and a second set of time-frequency resources in the frame. The first and the second set of time-frequency resources in the frame are reserved for communication of reference signal and/or control information in a pre-arranged direction. The direction of communication being one of: transmission and reception to or from one or more second communication nodes. The first communication node, and the one or more second communication nodes operate in a communications network. The first communication node also determines that the direction of communication of at least one of the first and second set of time-frequency resources is to be switched for at least one frame to a determined switched direction. The first communication node performs one of transmission or reception of control information in the at least one of the first and second set of time-frequency resources. This is performed according to the determined switched direction to or from, one or more third communication nodes operating in the communications network.

According to a second aspect of embodiments herein, the object is achieved by the first communication node configured to perform any one of transmission and reception in at least one of: the first set of time-frequency resources in the frame of time-frequency resources, and the second set of time-frequency resources in the frame. The first and the second set of time-frequency resources in the frame are reserved for communication of reference signal and/or control information in the pre-arranged direction. The direction of communication is one of: transmission and reception to or from one or more second communication nodes. The first communication node and the one or more second communication nodes are configured to operate in the communications network. The first communication node is further configured to determine that the direction of communication of at least one of the first and second set of time-frequency resources is to be switched for at least one frame to the determined switched direction. The first communication node is further configured to perform one of transmission or reception of control information in the at least one of the first and second set of time-frequency resources. This is performed according to the determined switched direction to or from, one or more third communication nodes configured to operate in the communications network.

According to a third aspect of embodiments herein, the object is achieved by a computer program, comprising instructions which, when executed on at least one processor, cause the at least one processor to carry out the method performed by the first communication node.

According to a fourth aspect of embodiments herein, the object is achieved by a computer-readable storage medium, having stored thereon a computer program, comprising instructions which, when executed on at least one processor, cause the at least one processor to carry out the method performed by the first communication node.

By the first communication node determining that the direction of communication of at least one of the first and second set of time-frequency resources is to be switched for at least one frame, the first communication node with e.g., half-duplex restrictions, may efficiently exchange control signaling with two or more communication nodes in the same frame, in both duplex directions. This may be performed in a configuration where the other sets of time-frequency resources in the frame have a fixed direction of communication, which allows for flexibility of the signalling in the communications network, while minimizing the signalling among the communication nodes involved in a communication.

BRIEF DESCRIPTION OF THE DRAWINGS

Examples of embodiments herein are described in more detail with reference to the accompanying drawings, in which:

FIG. 19 is a schematic diagram illustrating examples of consecutive transmission for TDD, with use of the same frame structure according to embodiments herein.

FIG. 20 is a schematic diagram illustrating examples of consecutive transmission for TDD with multi-nodes with use of the same frame structure according to embodiments herein.

DETAILED DESCRIPTION

As part of the development of embodiments herein, a problem will first be identified and discussed. In this discussion of the problem of existing methods, ANs are used as examples of communications nodes, but the discussion should not be understood to be limited to them.

Figure 1:
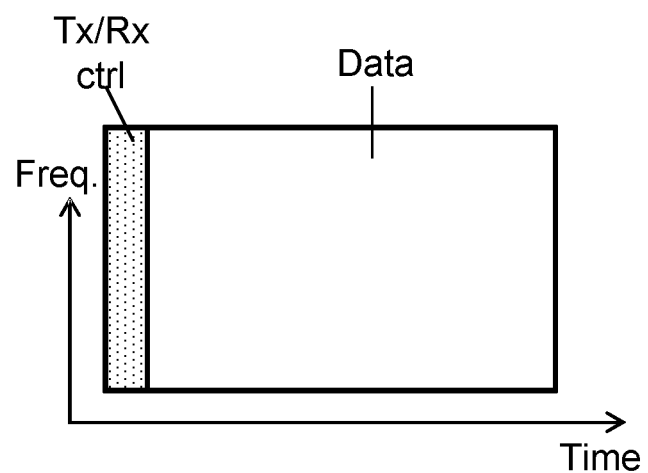
FIG. 1 is a schematic diagram depicting an example of a frame structure used in a wireless communication network, according to existing methods.
Figure 2:
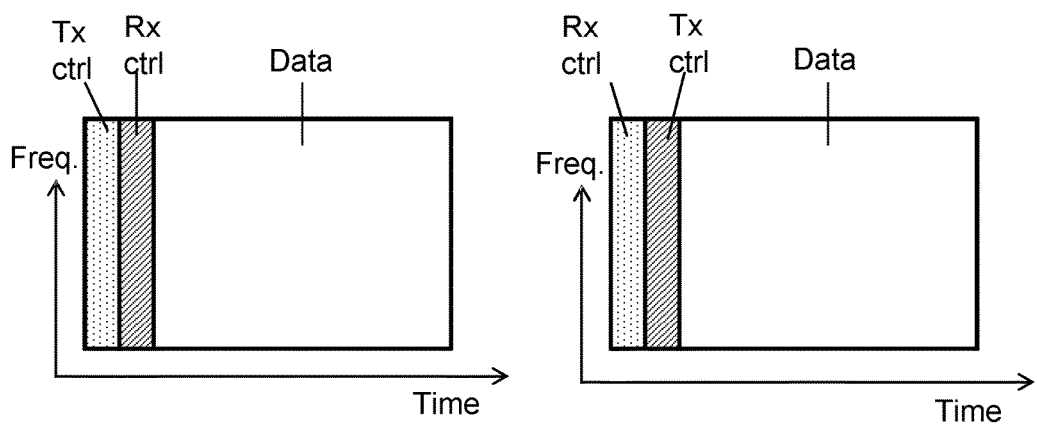
FIG. 2 is a schematic diagram of another possible frame structure and respective link-direction assignments, according to existing methods.
Figure 3:
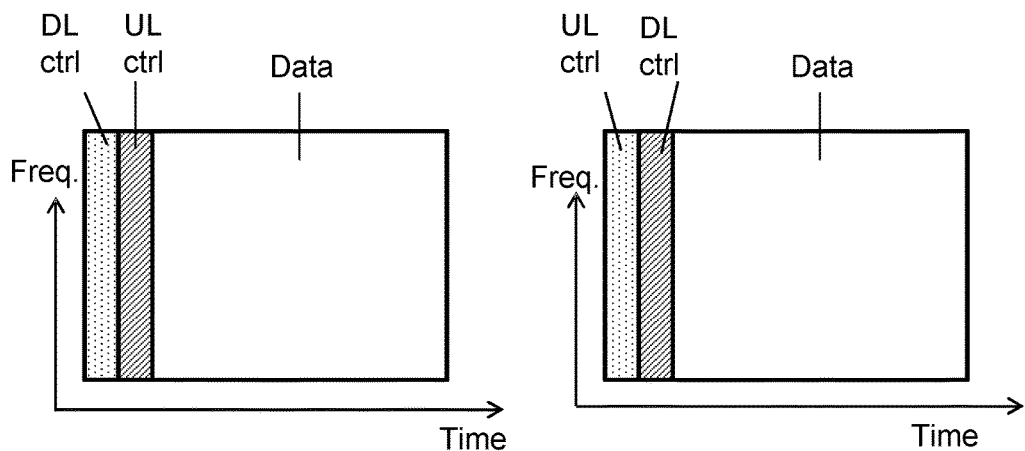
FIG. 3 is a schematic diagram of another possible frame structure and respective link-direction assignments, according to existing methods.
Figure 4:
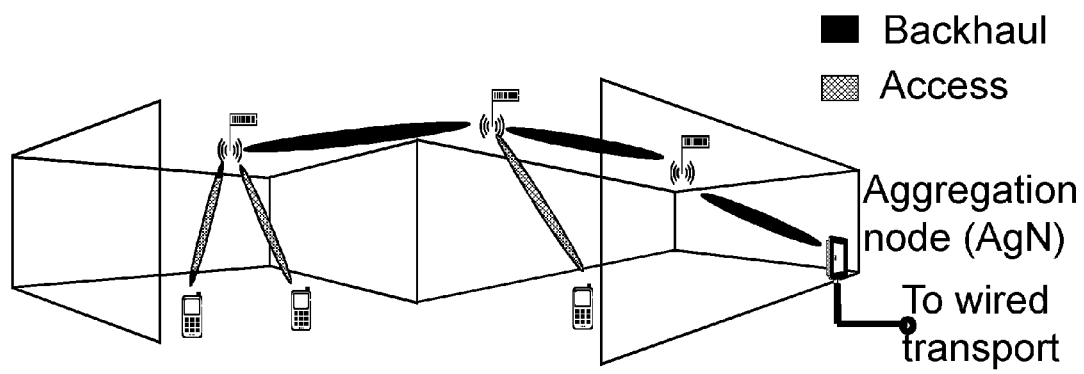
FIG. 4 is a schematic diagram illustrating a network using wireless self-backhauling.

If all communication in a communications network is organized according to the left panel of FIG. 2, then two ANs, without a wired connection, may not be able to exchange any control signaling with each other. The reason is that there are no control fields in which one AN transmits and the other one receives, i.e., either both transmit or both receive, at least under the assumption of time-aligned frames between links, as discussed above. The same, of course, holds if all communication is organized according to the right panel of FIG. 2.

Figure 9:
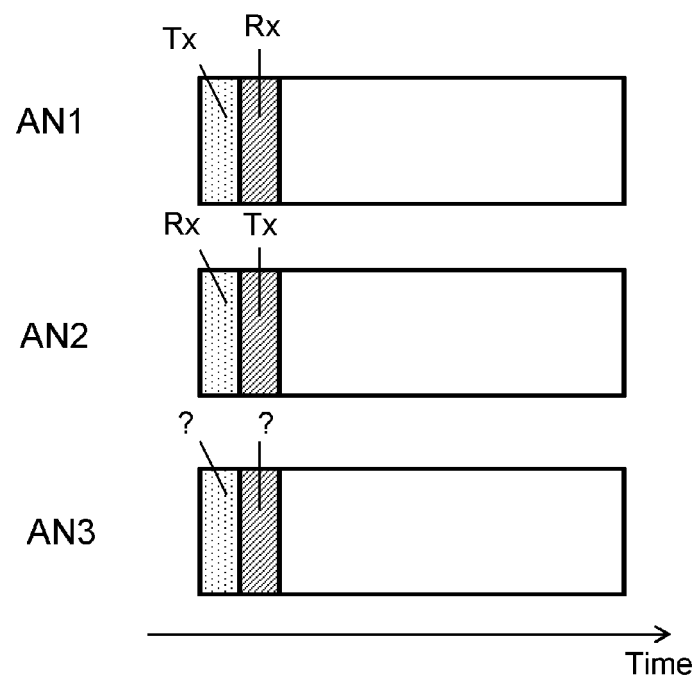
FIG. 9 is a schematic diagram illustrating a problematic control signaling situation in a network with fixed tx and rx assignment for control fields.

While for any given pair of ANs it may seem possible to have different assignments for rx and tx for the control fields for the respective ANs, i.e., left panel of FIG. 2 for one communication node and right panel for the other communication node, such approach does not work in general, as there may be other nodes in the system that expect certain assignments, that is, communications to or from other communication nodes, e.g., UEs. Also, if three ANs, AN1, AN2 and AN3, all wish to communicate with each other, there is no fixed assignment that works for all three links, as illustrated in FIG. 9. FIG. 9 is a schematic diagram illustrating a problematic control signaling situation in a network with fixed tx and rx assignment for control fields, since there is no choice of tx and rx that allows AN3 to communicate with both AN1 and AN2, within a certain time period, e.g., the illustrated frame.

In the existing UMTS and LTE standards, the frame structures are different for FDD and TDD, which result in different implementation between the FDD mode and the TDD mode. In the IEEE 802.11 standards, there is only one directional communication within one frame, i.e. either transmission or reception is possible within one frame time which limits the flexibility, and roundtrip time may be long.

Furthermore, having two control symbols of the time-frequency resources reserved for control information and/or reference signal, and a set of time-frequency resources reserved for data information of fixed size may not be necessary in some cases. Hence, in these cases, there is a waste of transmission resources.

Also, it should be noted that in existing wireless communication systems like UMTS and LTE in the 3GPP standards and the IEEE 802.11 standards, either single carrier modulation or multi-carrier modulation is used for both control and data transmissions. This is a suboptimal way to transmit/receive information, since it may be unnecessarily restrictive in the case of single carrier modulation, as independent signals may not be transmitted within a certain time period, or it may unnecessarily require expensive hardware, to compensate for the high PAPR associated with MCM.

Embodiments herein address these issues identified in existing approaches.

Terminologies

The following commonly terminologies are used in the embodiments and are elaborated below:

Radio network node: In some embodiments the non-limiting term radio network node is more commonly used and it refers to any type of network node serving UE and/or connected to other network node or network element or any radio node from where UE receives signal. Examples of radio network nodes are Node B, base station (BS), multi-standard radio (MSR) radio node such as MSR BS, eNode B, network controller, radio network controller (RNC), base station controller, relay, donor node controlling relay, base transceiver station (BTS), access point (AP), transmission points, transmission nodes, RRU, RRH, nodes in distributed antenna system (DAS) etc.

Network node: In some embodiments a more general term "network node" is used and it can correspond to any type of radio network node or any network node, which communicates with at least a radio network node. Examples of network node are any radio network node stated above, core network node (e.g. MSC, MME etc), O&M, OSS, SON, positioning node (e.g. E-SMLC), MDT etc.

User equipment: In some embodiments the non-limiting term user equipment (UE) is used and it refers to any type of wireless device communicating with a radio network node in a cellular or mobile communication system. Examples of UE are target device, device to device UE, machine type UE or UE capable of machine to machine communication, PDA, iPAD, Tablet, mobile terminals, smart phone, laptop embedded equipped (LEE), laptop mounted equipment (LME), USB dongles etc.

The embodiments herein also applies to the multi-point carrier aggregation systems.

Note that although terminology from 3GPP LTE has been used in this disclosure to exemplify the embodiments herein, this should not be seen as limiting the scope of the embodiments herein to only the aforementioned system. Other wireless systems, including WCDMA, Worldwide Interoperability for Microwave Access (WiMax), Ultra Mobile Broadband (UMB) and GSM, may also benefit from exploiting the ideas covered within this disclosure.

Also note that terminology such as eNodeB and UE should be considering non-limiting and does in particular not imply a certain hierarchical relation between the two; in general "eNodeB" could be considered as device 1 and "UE" device 2, and these two devices communicate with each other over some radio channel. Herein, we also focus on wireless transmissions in the DL, but the embodiments herein are equally applicable in the UL.

Embodiments will now be described more fully hereinafter with reference to the accompanying drawings, in which the embodiments herein will be illustrated in more detail by a number of exemplary embodiments. The claimed subject matter may, however, be embodied in many different forms and should not be construed as limited to the embodiments set forth herein. Rather, these embodiments are provided so that this disclosure will be thorough and complete, and will fully convey the scope of the claimed subject matter to those skilled in the art. It should be noted that these embodiments are not mutually exclusive. Components from one embodiment may be tacitly assumed to be present in another embodiment and it will be obvious to a person skilled in the art how those components may be used in the other exemplary embodiments.

The figures herein are schematic and simplified for clarity, and they merely show details which are essential to the understanding of the embodiments presented herein, while other details have been left out. Throughout, the same reference numerals are used for identical or corresponding parts or steps.

Figure 10:
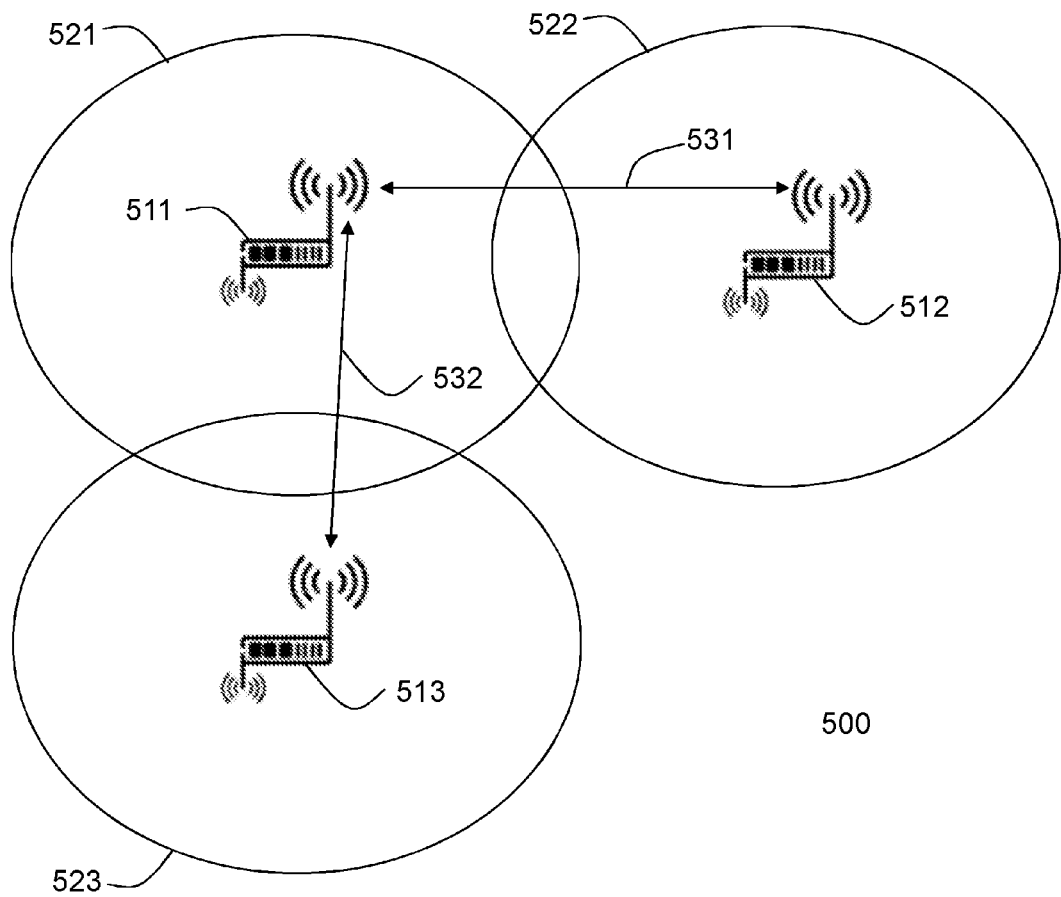
FIG. 10 is a schematic diagram illustrating an example of a communications network, according to some embodiments.
Figure 11:
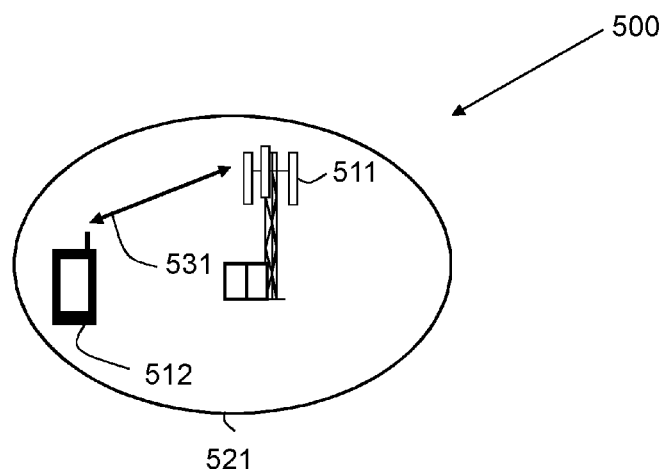
FIG. 11 is a schematic block diagram illustrating embodiments of communication nodes in the communications network, according to some embodiments.

Each of FIG. 10 and FIG. 11 depicts an example of a communications network 500 in which embodiments herein may be implemented. The communications network 500 may for example be a radio communications network such as a Long-Term Evolution (LTE), e.g. LTE Frequency Division Duplex (FDD), LTE Time Division Duplex (TDD), LTE Half-Duplex Frequency Division Duplex (HD-FDD), LTE operating in an unlicensed band, LTE-Advanced, Wideband Code Division Multiple Access (VVCDMA), Universal Terrestrial Radio Access (UTRA) TDD, GSM network, GSM/Enhanced Data Rate for GSM Evolution (EDGE) Radio Access Network (GERAN) network, EDGE network, UMB, network comprising of any combination of Radio Access Technologies (RATs) such as e.g. Multi-Standard Radio (MSR) base stations, multi-RAT base stations etc., any 3rd Generation Partnership Project (3GPP) network, WFi network, WMax, 5G system or any cellular network or system. The communications network 500 may also be an Ultra Dense Network (UDN) which e.g., may transmit on mmW.

The communications network 500 comprises a plurality of network nodes. The communications network 500 comprises a first communication node 511. The communications network 500 also comprises one or more second communication nodes 512, wherein each of the one or more second network nodes 512 is equivalent to the description provided herein for the second network node 512. The communications network 500 also comprises one or more third communication nodes 513, wherein each of the one or more third network nodes 513 is equivalent to the description provided herein for the third network node 513. For simplicity, three communication nodes, a first communication node 511, a second communication node 512, and a third communication node 513 are depicted in FIG. 10. The first communication node 511, the second communication node 512 and the third communication node 513, may each be a base station such as e.g. an eNB, eNodeB, BS, or any other network unit capable to serve a wireless device or a machine type communication device in the communications network 500, such as an AN, e.g., a short-range radio gateway, as depicted in the non-limiting example of FIG. 10. In some particular embodiments, any of the first communication node 511, the second communication node 512 and the third communication node 513 may be a stationary relay node or a mobile relay node. Further examples of the first communication node 511, the second communication node 512 and the third communication node 513 may also be e.g. a repeater, multi-standard radio (MSR) radio node such as MSR BS, network controller, Radio Network Controller (RNC), Base Station Controller (BSC), relay, donor node controlling relay, Base Transceiver Station (BTS), Access Point (AP), transmission points, transmission nodes, a Remote Radio Unit (RRU), a Remote Radio Head (RRH), nodes in Distributed Antenna System (DAS), core network node, e.g., MSC, MME, etc . . . , O&M, OSS, SON, positioning node, e.g., E-SMLC, MDT, etc.

The communications network 500 covers a geographical area which may be divided into cell areas, wherein each cell area is served by a radio communication node, at, e.g., a base station site or at remote locations in Remote Radio Units (RRU), although, one radio communication node may serve one or several cells. In the example depicted in FIG. 10, the first communication node 511 serves a first cell 521, the second communication node 512 serves a second cell 522, and the third communication node 513 serves a third cell 523. The cell definition may also incorporate frequency bands and radio access technology used for transmissions, which means that two different cells may cover the same geographical area but using different frequency bands. Each cell may be identified by an identity within the local radio area, which may be broadcast in the cell. Another identity identifying the first cell 521, second cell 522 and third cell 523 uniquely in the whole communications network 500, which may be a radio communications network, may also be broadcasted in the first cell 521, second cell 522 and third cell 523. The first communication node 511, the second communication node 512 and the third communication node 513 may communicate over the air or radio interface operating on radio frequencies with the UEs within range of the first communication node 511, the second communication node 512 and the third communication node 513. Any of the first communication node 511, the second communication node 512 and the third communication node 513 may be e.g. macro eNodeB, home eNodeB or a Home Node B, pico BS or femto BS, based on transmission power and thereby also cell size. Typically, the communications network 500 may comprise more cells similar to the first cell 521, the second cell 522 and the third cell 523, served by their respective radio communication nodes. This is not depicted in FIG. 10 or FIG. 11 for the sake of simplicity.

In other examples than those depicted in FIG. 10 and FIG. 11, wherein the communications network 500 is a cellular system, any of the first communication node 511, the second communication node 512 and the third communication node 513 may serve cells. In other examples than those depicted in FIG. 10 and FIG. 11, wherein the communications network 500 is a non-cellular system, any of the first communication node 511, the second communication node 512 and the third communication node 513 may serve receiving nodes with serving beams.

Each of the first communication node 511, the second communication node 512 and the third communication node 513 may support one or several cellular communication technologies, e.g., IEEE 802.11ah, BLE etc. . . . and its name may depend on the technology and terminology used. The first communication node 511 may communicate with the second communication node 512 through a first link 531. The first communication node 511 may communicate with the third communication node 513 through a second link 532. Each of the first link 531 and the second link 532 may be a wireless link, such as a radio link an optical link, or a wired link. Hence, the communications network 500 may be one of: a wireless communications network 500 and a radio communications network 500. A wireless communications network may be understood herein as a network where at least some of the communication between nodes is performed over another medium than a wire, e.g., wireless optical communication, i.e., infrared light. A radio communications network is here a network where at least some communication is performed using electromagnetic waves at radio frequencies, transmitted over the air, via wire, or some other medium. Today's cellular telephony networks may hence be both, wireless communications networks and radio communications networks. In some embodiments, any of the first communication node 511, the second communication node 512 and the third communication node 513 may operate with wireless self-backhauling.

Any of the first communication node 511, the second communication node 512 and the third communication node 513 may also be a communications device, also known as e.g., wireless communication device, UE, mobile terminal, wireless terminal, mobile station, mobile telephone, cellular telephone, or laptop with wireless capability, just to mention some further examples. The communications device in the present context may be, for example, portable, pocket-storable, hand-held, computer-comprised, or vehicle-mounted mobile devices, enabled to communicate voice and/or data, via the RAN, with another entity, such as a server, a laptop, a Personal Digital Assistant (PDA), or a tablet computer, sometimes referred to as a surf plate with wireless capability, Machine-to-Machine (M2M) devices, devices equipped with a wireless interface, such as a printer or a file storage device, modems, sensors equipped with a UE, Laptop Mounted Equipment (LME), e.g., USB, Laptop Embedded Equipments (LEEs), Machine Type Communication (MTC) devices, Customer Premises Equipment (CPE), target device, device-to-device (D2D) wireless device, or any other radio network unit capable of communicating over a wireless or wired link in the communications network 500, e.g., with any of the first communication node 511, the second communication node 512 and the third communication node 513 when present in the first cell 521, second cell 522 and third cell 523, respectively. The communications device may be wireless, i.e., it may be enabled to communicate wirelessly in the communications network 500, sometimes also referred to as a cellular radio system or cellular network. The communication may be performed e.g., between two communications devices, between the communications device and a regular telephone and/or between the communications device and a server. The communication of the communications device may be performed e.g., via a RAN and possibly one or more core networks, comprised within the communications network 500.

In the embodiment depicted in FIG. 11, the first communication node 511 is an eNodeB serving the first cell 521. The second communication node 512 is a wireless communication device, as defined above, located within the first cell 521. The second communication node 512 is configured to communicate within the communications network 500 via the first communication node 511 over the first link 531, which in this embodiment is a radio link, when present in the first cell 521 served by the first communication node 511.

Any of the first communication node 511, the second communication node 512 and the third communication node 513 may have at least one of: half-duplex capability and duplex capability. In some particular embodiments, any of the first communication node 511, the second communication node 512 and the third communication node 513 may operate at half-duplex. In some particular embodiments, at least one of the the first communication node 511, the second communication node 512 and the third communication node 513 has only half-duplex capability.

The usage of the nomenclature first, second and third communication node is arbitrary and is only used to distinguish between the references to the communication nodes, according to an order, which may be an order of description herein.

Figure 12:
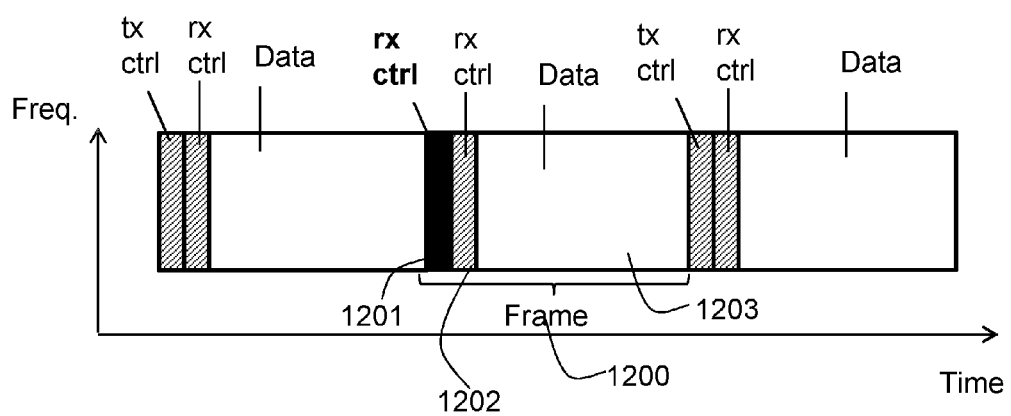
FIG. 12 is a schematic diagram illustrating a frame, according to some embodiments.

Embodiments of a method performed by the first communication node 511 will now be described with reference to examples of a frame such as frame 1200 depicted in FIG. 12. The example of FIG. 12 depicts a frame 1200 of time-frequency resources, with a first set of time-frequency resources 1201 in the frame 1200 of time-frequency resources, and a second set of time-frequency resources 1202 in the frame 1200. Examples of time-frequency resources are symbols, resource elements, OFDM symbols, FBMC symbols, symbols of some of the type of MCM scheme, a set of any of the mentioned types of symbols, etc. . . . . Examples of the frame 1200 according to embodiments herein, illustrating the first set of time-frequency resources 1201 and the second set of time-frequency resources 1202 will be presented later in relation to FIGS. 12-22, the particular example of frame 1200 in FIG. 12 is not limiting. However, the reference numbers used for the time-frequency resources throughout the description of the method of FIG. 13 and subsequent figures refer to those used in FIG. 12. FIG. 12 will be described in further detail below. While frame is used herein, it will be understood that the same applies to e.g., a subframe. Therefore a reference to the frame 1200 is understood herein to equally refer to a subframe. The frame 1200 may also comprise a third set of time-frequency resources 1203, as described below, and as shown in FIG. 12.

Embodiments of a method performed by the first communication node 511 for performing any one of transmission and reception in at least one of: the first set of time-frequency resources 1201 in the frame 1200 of time-frequency resources, and a second set of time-frequency resources 1202 in the frame, will now be described with reference to the flowchart depicted in FIG. 13. The first and the second set of time-frequency resources 1201, 1202 in the frame 1200 are reserved for communication of reference signal and/or control information in a pre-arranged direction. The control information may, for example, be any information for communication between nodes, e.g. scheduling information, transmission notification, data coding and modulation format, reception acknowledgement, channel state information, etc. The reference signal information may, for example, be reference signals that are inserted in the control field in order to e.g. assisting in the demodulation of the control information at a receiver end. The direction of communication may be one of: transmission and reception to or from the one or more second communication nodes 512. In some embodiments, the at least one first set of time-frequency resources 1201 and the second set of time-frequency resources 1202 are non-overlapping in time.

The first communication node 511, and the one or more second communication nodes 512 operate in the communications network 500.

In some particular embodiments, the first communication 511 node is the wireless device 512 or the network node 511 in the wireless communications network 500.

Figure 13:
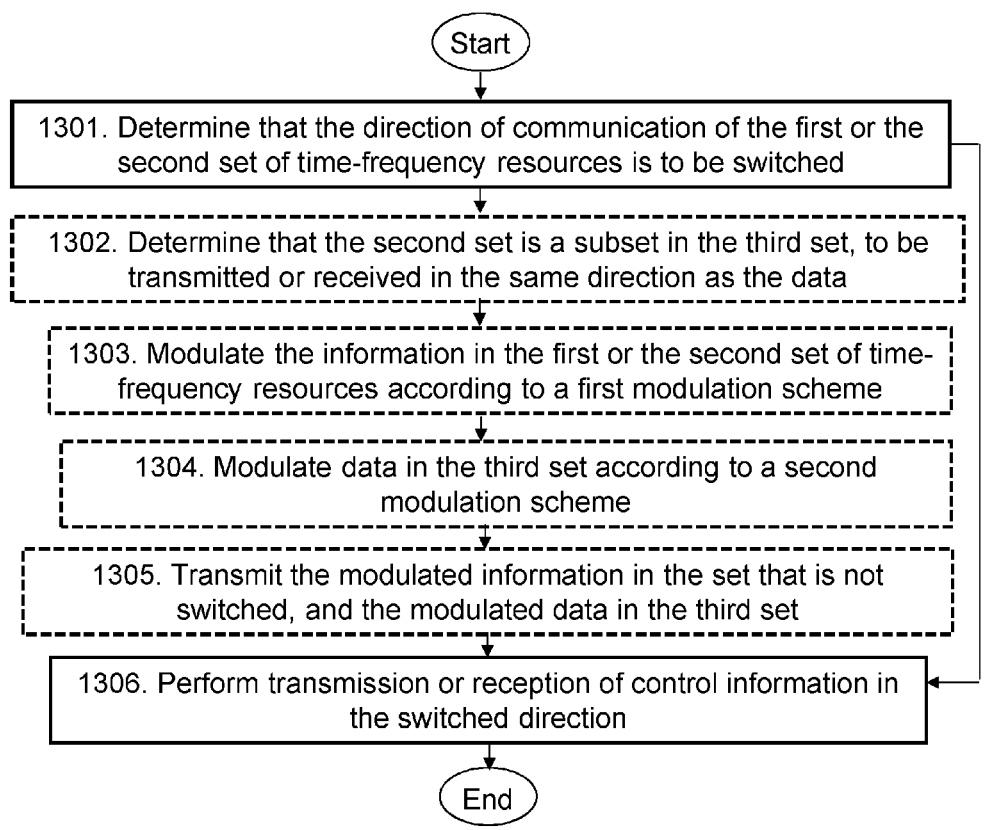
FIG. 13 is a schematic diagram illustrating embodiments of a method in a first communication node, according to some embodiments.

FIG. 13 depicts a flowchart of the actions that are or may be performed by the first communication node 511 in embodiments herein. A dashed line depicts an optional action.

In some embodiments, all the actions may be performed. In some embodiments, one or more actions may be performed. In some embodiments, the order of the actions illustrated in FIG. 13 may be changed in one or more actions. One or more embodiments may be combined, where applicable. All possible combinations are not described to simplify the description.

In some examples, transmission may be used as an illustrative example of communication. However, any reference to transmission may be understood to also apply to reception.

In the following discussion a communication node is understood to refer to a node as any of the first communication node 511, the second communication node 512 and the third communication node 513, described below in reference to FIGS. 10 and 11.

Action 1301

To understand the objective of the actions described herein, a scenario such as that illustrated in FIG. 9 may be considered as a starting point to be improved by the method herein. The first communication node 511, the one or more second communication nodes 512, and the third communication node 513 may each have a fixed tx and rx assignment for the first and second sets of time-frequency resources, e.g. fields, in the frame 1200. In order to increase the flexibility in the exchange of information between communication nodes in the communications network 500, and allow for the first communication node 511, the one or more second communication nodes 512, and third communication node 513 to exchange information with each other within a certain time window, e.g. one frame 1200 or under two frames 1200, in this Action, the first communication node 511 determines that the direction of communication of at least one of the first and second set of time-frequency resources 1201, 1202 is to be switched for at least one frame 1200 to a determined switched direction. The determined switched direction is understood to correspond herein to a switched direction of communication, with respect to the direction of communication of at least one of the first and second set of time-frequency resources 1201, 1202.

This Action 1301 may be performed by intermittently changing direction for one or both control fields in one or more communication nodes, so that they may communicate with each other. For example, in one embodiment, control signaling for a link may be configured to occur only once every second frame 1200, so that the other frames 1200 may be used for control signaling with other communication nodes in arbitrary tx/rx direction. Therefore, particular embodiments herein may refer to a flexible duplex of two control slots.

The changes may be pre-agreed between one or more of the involved communication nodes, or they may be autonomously performed by an individual communication node. The pre-agreed changes may either be agreed frame 1200 by frame 1200, or they may e.g., be agreed for a set of multiple frames 1200, e.g., at regular time intervals. For example, in some embodiments, the determined switched direction is for two or more frames 1200.

In a possible implementation, two communication nodes communicating over a link may agree, e.g., by one of the communication nodes informing the other one, that in every second frame 1200, control signaling in at least one of the tx/rx directions should be canceled, so the two nodes may exchange control signaling with other nodes in the communications network 500. If the communication nodes have spatial beamforming capabilities, they may in the control fields in these frames 1200 form beams in other spatial directions. Since control signaling between the two nodes may now be limited to every second frame 1200, bundling of control information may be needed, e.g., instead of one ACK/NACK message every frame 1200, a communication node may send two ACK/NACK messages in every second frame 1200. More generally, the change of tx/rx direction may not occur in every second frame 1200, but e.g. in every third or fourth frame 1200, or according to some more complicated pattern. Thus, in some embodiments, the determined switched direction corresponds to a pattern. In some embodiments, the pattern is a regular pattern.

In another example, an individual communication node such as the first communication node 511 may take an autonomous decision not to send control information to its normal communication partner, the one or more second communication nodes 512, in a certain frame 1200, but instead use the tx control field for reception from, or transmission to, some other communication node, e.g., the third network node 513, either pre-agreed transmission from that communication node, or possibly broadcast transmission from that communication node. The normal communication partner may thus be unable to decode any control signaling message in such a frame 1200, since there is none. This is something that in principle may anyway happen in a radio communication due to disturbances or fading. The communication receiving node may in such cases be designed to listen for the control signaling message in the next frame 1200.

According to the foregoing, the determined switched direction may be one of: a pre-agreed direction with the one or more second communication nodes 512, and an autonomously determined switched direction. That is, the determining of the direction of communication in this Action may be based on a pre-agreed arrangement with the one or more second communication nodes 512, or it may be performed autonomously.

For example, all control fields may by default be used for receiving, and may be changed to transmission if there is control signaling to transmit. Which of the control fields to use when control signaling is transmitted may be pseudo-random or pre-arranged, or depend on a current time. Thus, the set of time-frequency resources, of the first and second set of time-frequency resources 1201, 1202, determined to switch communication direction may be determined based on one of the following manners: pseudo-random, prearranged and based on a current time.

Action 1302

In another embodiment, the at least one frame 1200 may further comprise a third set of time-frequency resources 1203 used for transmission or reception of data. Data information may be understood herein to refer to payload data, which may in turn comprise data information as well as control information for higher layers in the protocol stack. In order to more dynamically and spectrum efficiently assign or allocate time-frequency resources for transmission or reception of reference signal and control information, the first communication node 511 may, in this optional action, determine that the second set of time-frequency resources 1202 is a subset of time-frequency resources in the third set of time-frequency resources 1203.

In other words, a frame 1200, or subframe 1200, may comprise a control field and a data field. The data field may comprise a sub-field for reference signals, pilots, and control information when, for example, there is data transmission performed between the first communication node 511 and at least a second communication node of the one or more second communication nodes 512.

In some particular embodiments, the subset of time-frequency resources is to comprise reference signal and/or control information to be transmitted or received in the same direction as the data in time-frequency resources in the third set of time-frequency resources 1203.

Hence, the issues mentioned earlier in regards to a wastage of resources by a fixed assignment of time-frequency resources for control and data information are addressed by the embodiments presented herein, by disclosing the frame 1200 structure with one control field and one data field which comprises one sub-field for reference signal and control information transmitting in the same direction as data.

In some embodiments, the subset of time-frequency resources in the third set of time-frequency resources 1203 may correspond to the first occurring time-frequency resources in the third set of time-frequency resources 1203. In other embodiments, the 30 second set of the time-frequency resources in the frame 1200 may correspond to the last occurring time-frequency resources in the frame 1200.

In some embodiments, the subset of time-frequency resources in the third set of time-frequency resources 1203 correspond to time-frequency resources occurring during the same time period in the frame 1200, e.g. belonging to the same symbol, e.g. OFDM symbol. Furthermore, in some embodiments, the first set of time-frequency resources 1201 correspond to the first occurring time-frequency resources in the frame 1200.

In some embodiments, the first set of time-frequency resources 1201 and the third set of time-frequency resources 1203 have different duplex directions, wherein the directions are directions of communication, such as, transmission or reception. This may occur, for example, when the first communication node 511 has determined or detected a need for different duplex directions. Based on this determining or detection, the first communication node 511 may determine to use the subset in the third set of time-frequency resources 1203 to comprise reference signal or control information instead of some other normal/default/pre-configured/pre-agreed type of information previously reserved for the transmission resource, and switch the duplex direction of the first set of time-frequency resources 1201, e.g. from transmission to reception or reception to transmission.

It may further be noted that additional reference signals may also be inserted in the data field if needed, as well as, a measurement gap.

Action 1303

In order to decode the control signals, a receiver may need to estimate the channel. This may be achieved by comparing the received signals with the known transmitted reference signal information, i.e., reference or pilot sequence. The reference signal may in principle be transmitted before, after, or at the same time as the control signals. However, if there is only one time symbol used for control signals in a frame 1200, e.g. in one duplex direction, then that symbol may need to comprise both the control signals and reference signal which are independent signals.

As already mentioned, in some embodiments, the at least one frame 1200 may further comprise the third set of time-frequency resources 1203 used for transmission or reception of data. Also as stated earlier, existing wireless communication networks may use either single carrier modulation or multi-carrier modulation for both control and data transmissions. In the frame 1200 structure described herein, any of the first set of time-frequency resources 1201 and the second set of time-frequency resources 1202 may comprise independent signals, such as the control information and the reference signal. Hence, single carrier modulation for first set of time-frequency resources 1201 and the second set of time-frequency resources 1202 is not optimal, as it may not allow to transmit the control information and the reference signal as independent signals. Single carrier modulation for data information may be appropriate as there may be multiple symbols in a subframe to use, and single carrier may be used for each symbol. In some examples, one of them, typically the first one, if necessary, may be used to transmit RS, and rest of the symbols may be used to transmit data. In order to allow for the transmission of information in the frame 1200 appropriately with respect to a certain transmission power budget, in this Action, the first communication node 511 may modulate the reference signal and/or control information in at least one of the first set of time-frequency resources 1201 and the second set of time-frequency resources 1202 according to a first modulation scheme, wherein the first modulation scheme is capable of simultaneous transmissions of multiple independent signals. The different independent signals may e.g., be control or pilot signals, i.e. signals comprising control information and/or reference signal information. It may further be noted that a modulation scheme is herein understood to refer to schemes such as OFDM, DFTS-OFDM, FBMC, etc, which may be also referred to as "multiplexing schemes", and not to so-called constellation types such as BPSK, QPSK, 16QAM, etc.

In some embodiments, the first modulation scheme comprises one of: clustered DFTS-OFDM, simultaneous transmission of multiple DFTS-OFDM signals, interleaved clustered DFTS-OFDM, simultaneous transmission of multiple interleaved DFTS-OFDM signals, MCM, OFDM, FBMC, etc. . . . . Clustered DFTS-OFDM, clustered-OFMC, any clustered-MCM, interleaved OFDM, interleaved-FBMC, any interleaved-MCM, interleaved DFT-precoded OFDM, interleaved-DFT-precoded FBMC, any interleaved-DFT-precoded-MCM, etc. may be used for the control information and reference signal information, i.e. control and reference signals (RS).

Figure 6:
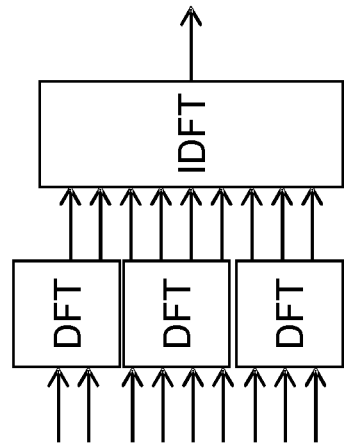
FIG. 6 is a schematic diagram depicting an example of clustered DFT-spread OFDM.
Figure 5:
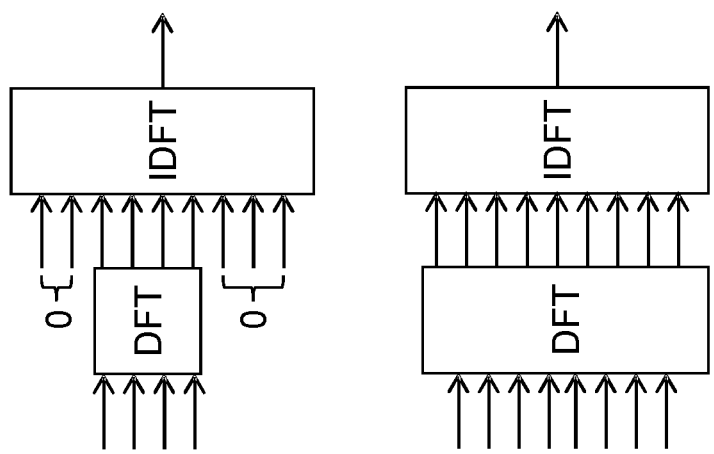
FIG. 5 is a schematic diagram depicting examples of single carrier localized DFT-spread OFDM.

In other words, for the control part, to facilitate transmission of both the control information and the reference signal in the same symbol period, two or several clusters DFT Spread OFDM (DFTS-OFDM) may be used to comprise reference signal information (RS) and control information separately, such as, e.g. shown in FIG. 6. To have more regular distribution of RS signals, the interleaved DFTS-OFDM shown in FIG. 7 may be used, i.e. two clusters of signals and evenly distributed sub-carriers. Here, more clusters and un-even distributions, as shown to the right in FIG. 8.

However, transmission with more than one cluster DFTS-OFDM may break the single carrier characteristics and thus may result in higher PAPR. According to some embodiments, an approached provided herein may be to keep the number of clusters to two, or another low number, to keep the PAPR low, and use power back-off to avoid power saturation when needed. Here, power saturation may be considered to be a power level above which the distortion of the signals is above a certain determined threshold. It may be noted that some power saturation may be tolerated, e.g. due to a few short peak power levels. In addition, power back-off may be applied to the control field/s to keep the PAPR low. Note that OFDM here is just an example and may be replaced by any MCM such as, e.g. FBMC, etc. Furthermore, in some embodiments, robust channel coding may be applied to the reference signal information and/or control information to compensate for the performance loss due to power back-off.

To have additional flexibility in the control channel, a MCM may be used. This may however result in a high PAPR. Here, according to some embodiments, an approach that is provided is to check the possibility of applying the pure MCM by checking the power possible for the data part and compare the power that may be needed for the control part, to determine what modulation is to be used in the control field. This procedure is described later in the flow chart of FIGS. 24 and 25.

It should also be noted that, in addition, parts of the multi-carrier modulated, or clustered-OFDM, control field may be transmitted to different communication nodes than a second communication node of the one or more second communication nodes 512, which is the destination node of the data part. In other words, some portions of the control information and reference signals may have different destination nodes than some other portions of signals in the same control field and the same symbol time period.

Action 1304

In order to allow a low hardware cost by applying low PAPR scheme, and at the same time provide flexibility in the transmission of data in the frame 1200, in this action, the first communication node 511 may modulate the data in the third set of time-frequency resources 1203 according to a second modulation scheme, wherein the second modulation scheme is a different modulation scheme than the first modulation scheme.

In some embodiments, the second modulation scheme is a single carrier modulation scheme. Here, the single carrier modulation scheme may comprise one of: single carrier, DFTS-OFDM, interleaved DFTS-OFDM, interleaved DFT-precoded OFDM, DFTS-FBMC, filter-bank precoded FBMC, precoded multi-carrier modulation, etc.

In other words, for the data part, single carrier DFTS-OFDM or any transmission scheme with low PAPR may be used, which may facilitate a low PARP transmission. Hence, in some embodiments, the first modulation scheme has a higher peak-to-average-power-ratio (PAPR) than the second modulation scheme.

In some examples, the modulating in action 1303 further comprises providing, in the first modulation scheme, a more robust channel coding than provided in the second modulation scheme. This means that the coding scheme applied in the first modulation scheme may be more robust than the coding scheme applied in the second modulation scheme. For example, the first modulation scheme may be coded with the same coding as the second modulation scheme, but with a lower code rate. According to another example, different coding schemes may be applied in the first and second modulation scheme, such as, convolutional coding and turbo coding, e.g. with different code rates such that one coding scheme is more robust than the other.

In some embodiments, the at least one first set of time-frequency resources 1201 and the second set of time-frequency resources 1202 are characterized by time domain separation.

Hence, according to Actions 1303 and 1304, an embodiment of the frame 1200 structure is described herein, with data field modulation using e.g. a single carrier or DFT-spread OFDM or DFT-spread FBMC, or Filter-bank pre-coded FBMC, or any pre-coded MCM transmission to keep PAPR low, and with control fields with multi-carrier modulation to transmit control information and the reference signal at the same time that the reference signals. The latter may be used to assist demodulation of control information and possibly data at a receiver end. For example, two or a few clusters localized DFTS-OFDM, or any other localized precoded-MCM, or interleaved DFTS-OFDM, or any other interleaved precoded-MCM, may be used for the control field to maintain lower PARP relative to a pure MCM.

As stated earlier, it may further be noted that parts of the multi-carrier modulated control field signals may be destined to one or several other communication nodes than a second communication node of the one or more second communication nodes 512.

According to the foregoing, in some embodiments, the reference signal and/or control information in the subset of time-frequency resources in the third set of time-frequency resources 1203 may be modulated using one of: a) a different modulation scheme than the data in the time-frequency resources in the third set of time-frequency resources 1203, and b) the same modulation scheme as the control information in the first set of time-frequency resources 1201, wherein the used modulation schemes may be one of: a MCM scheme, or a single-carrier modulation scheme. In some embodiments, the reference signal and/or control information in the subset of time-frequency resources in the third set of time-frequency resources 1203 may be modulated using the same modulation scheme as the data in time-frequency resources in the third set of time-frequency resources 1203. This may be advantageous because, since the reference signal (pilot) is to be used for data demodulation, it may be simpler to construct channel estimation for the data part by having the same modulation scheme as data.

In this case, the subset of time-frequency resources in the third set of time-frequency resources 1203 may further comprise reference signal information for demodulating the reference signal and/or control information and the data in time-frequency resources in the third set of time-frequency resources 1203 in the frame 1200.

Alternatively, in some embodiments, the reference signal and/or control information in the subset of time-frequency resources in the third set of time-frequency resources 1203 may be modulated using a different modulation scheme than the data in the time-frequency resources in the second set of time-frequency resources 1202. This may be advantageous because, keeping the same modulation scheme for data, independent of the first subset, might simplify the implementation of data demodulation. In this case, the subset of time-frequency resources in the third set of time-frequency resources 1203 may further comprise reference signal information for demodulating the reference signal and/or control information in the third set of time-frequency resources 1203. Furthermore, according to some embodiments, the reference signal and/or control information in the subset of time-frequency resources in the third set of time-frequency resources 1203 is modulated using the same modulation scheme as the control information in the first set of time-frequency resources 1201.

In some embodiments, the modulation scheme(s) are one of a multi-carrier modulation scheme, such as, OFDM modulation, FBMC modulation, filtered multi-tone modulation, etc., or a single-carrier modulation scheme, such as, a single-carrier modulation, a precoded multi-carrier modulation, e.g., DFTS-OFDM modulation, a filter bank pre-coded FBMC modulation, etc.

In some embodiments, the frame 1200 comprises a fourth set of time-frequency resources 1501 used for transmission or reception of control information and the fourth set of the time-frequency resources in the frame 1200 may correspond to the last occurring time-frequency resources in the frame 1200. Here, the first communication node 511 may further perform one of transmission or reception of control information in the fourth set of time-frequency resources 1501.

By having the first communication node 511 perform as described in the embodiments above, a single carrier modulation for data and multi-carrier modulation for reference signal and/or control information is achieved which lead to low PAPR for data transmissions and efficient resource utilization of transmission resources for transmission of reference signal and/or control information. Hence, the flexibility and spectral efficiency of transmission resources in the communications network 500 is improved.

Action 1305

In this action, the first communication node 511 may transmit the modulated reference signal and/or control information in the one of the first set of time-frequency resources 1201 and the second set of time-frequency resources 1202 the direction of communication of which is not to be switched. The first communication node 511 may also transmit the modulated data in the third set of time-frequency resources 1203 to at least one second communication node 512 of the one or more second communication nodes 512.

Action 1306

Finally, in this action, the first communication node 511 performs one of transmission or reception of control information in the at least one of the first and second set of time-frequency resources 1201, 1202, according to the determined switched direction, to or from the one or more third communication nodes 513 operating in the communications network 500.

According to embodiments related to Action 1302, in some embodiments, the performing in this Action 1303 may further comprise performing transmission or reception of the reference signal and/or control information in at least one subset of the first set of time-frequency resources 1201 and/or the subset of time-frequency resources in the third set of time-frequency resources 1203 to or from the one or more third communication nodes 513.

In some embodiments, the performing one of transmission or reception of control information may comprise transmission of the modulated reference signal and/or control information in the at least one first set of time-frequency resources 1201 and the second set of time-frequency resources 1202 to the one or more third communication nodes 513 operating in the communications network 500.

In some embodiments, the one or more third communication nodes 513 are different than the one or more second communication nodes 512, the one or more second communication nodes 512 being current communication partners of the first communication node 511.

The first communication node 511 is different than the third communication node 513. In some embodiments, the one or more second communication nodes 512 and the one or more third communication nodes 513 may be the same node. In some other embodiments, the one or more second communication nodes 512 may be different than one or more third communication nodes 513. The one or more third communication nodes 513 is in some embodiments the same communication partner/s as the one of any of first set of time-frequency resources 1201 in a or the frame 1200 and the second set of time-frequency resources 1202 in a or the frame 1200. The one or more third communication nodes 513 is in some embodiments a different node than the communication partner of the one of any of first set of time-frequency resources 1201 in a or the frame 1200 and the second set of time-frequency resources 1202 in a or the frame 1200.

Beamforming may be applied to any tx signal, as well as to any rx signal. Different beamforms may target the same communication node or, more often, different communication nodes. Beamforming may be achieved using different antennas directed in different spatial directions, or using the same, or partly overlapping, sets of multi-antenna elements with different precoder settings, that is, different precoder weights. Beamforms are in general not restricted to a single narrow lobe, but may have more complex shapes, depending on the precoder. The precoders are typically linear, in which case they may be described in terms of a set of precoder weights, but may in principle also be non-linear.

FIG. 13 is a schematic diagram illustrating a non-limiting example of embodiments here. Three frames are depicted in FIG. 13, wherein the first set of time-frequency resources 1201 and the second set of time-frequency resources 1201, 1202 in the frame 1200 are reserved for communication of reference signal and/or control information in a pre-arranged direction, which is tx and rx, respectively. In the middle frame 1200, the first network node 511 determines that the direction of communication of the first set of time-frequency resources 1201 is to be switched for the frame 1200 from the tx direction to the rx direction. Hence, FIG. 13 depicts one control field according to embodiments herein, that has an tx/rx direction that deviates from the regular pattern, as indicated in bold by the field colored in solid black. In this example, each of the frames 1200 comprises two control fields, and one data field, that is the third set of time-frequency resources 1203. The direction of communication of the control fields is indicated in the Figure with tx for transmission, and rx for reception.

Figure 14:
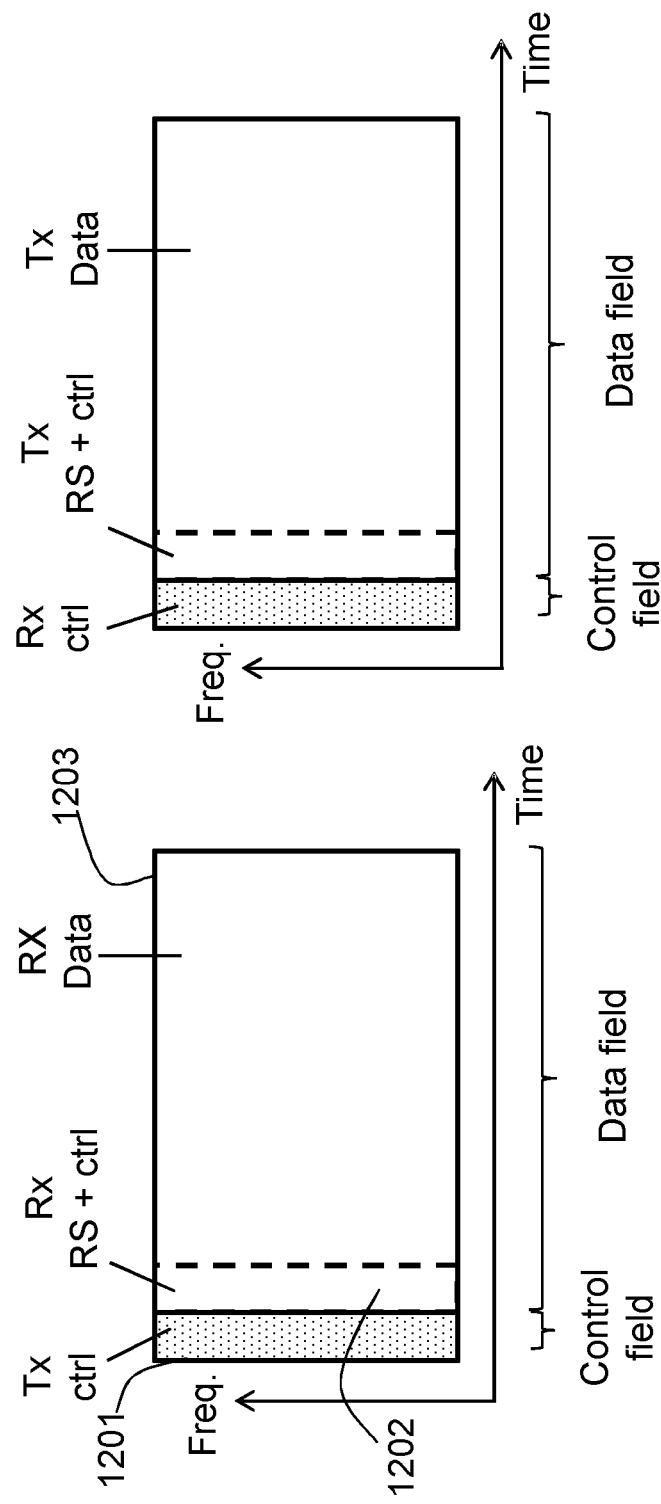
FIG. 14 is a schematic diagram depicting examples of frame structures used in the communications network, according to some embodiments.

FIG. 14 depicts examples of frame 1200 structures according to embodiments of the method performed by the first communication node 511 in relation to Action 1302, wherein a data field such as the third set of time-frequency resources 1203 in the frame 1200, or subframe 1200 comprises a sub-field such as the second set of time-frequency resources 1202 for reference signals, pilots, and control information. The frame 1200 or subframe 1200 also comprises a control field such as the first set of time frequency resources 1201. That is, here, it may be seen that the frame 1200 or subframe 1200 structure may comprise two control fields, indicated by the dotted and dashed fields, and a data field. The example on the right depicts some exemplary direction of communication assignments for the different fields, which are different than those of the example on the left.

Figure 15:
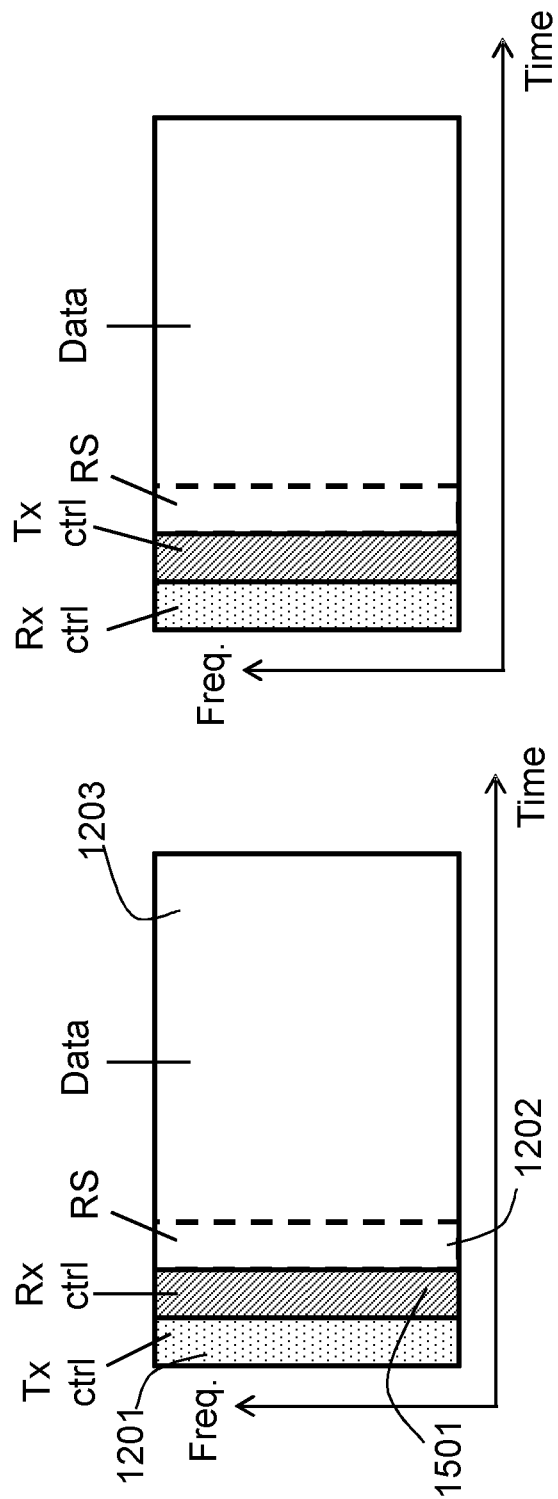
FIG. 15 is another schematic diagram depicting examples of frame structures according to embodiments herein.

FIG. 15 depicts further examples of frame 1200 structures according to embodiments of the method and first communication node 511. Here, it may be seen that a frame 1200 or subframe 1200 structure may comprise two control fields, indicated by the dotted, and striped fields, a field comprising RS indicated by the dashed fields, and a data field. In the examples depicted in FIG. 15, the second set of time-frequency resources 1202 is the subset of time-frequency resources in the third set of time-frequency resources 1203, and there is a fourth set of time-frequency resources 1501, which is the second control field. That is, the data field may also comprise a subfield for reference signals, pilots, as shown in FIG. 15. The left and right frames in FIG. 15 are two examples of the same structure with different duplex directions on the control fields.

Figure 16:
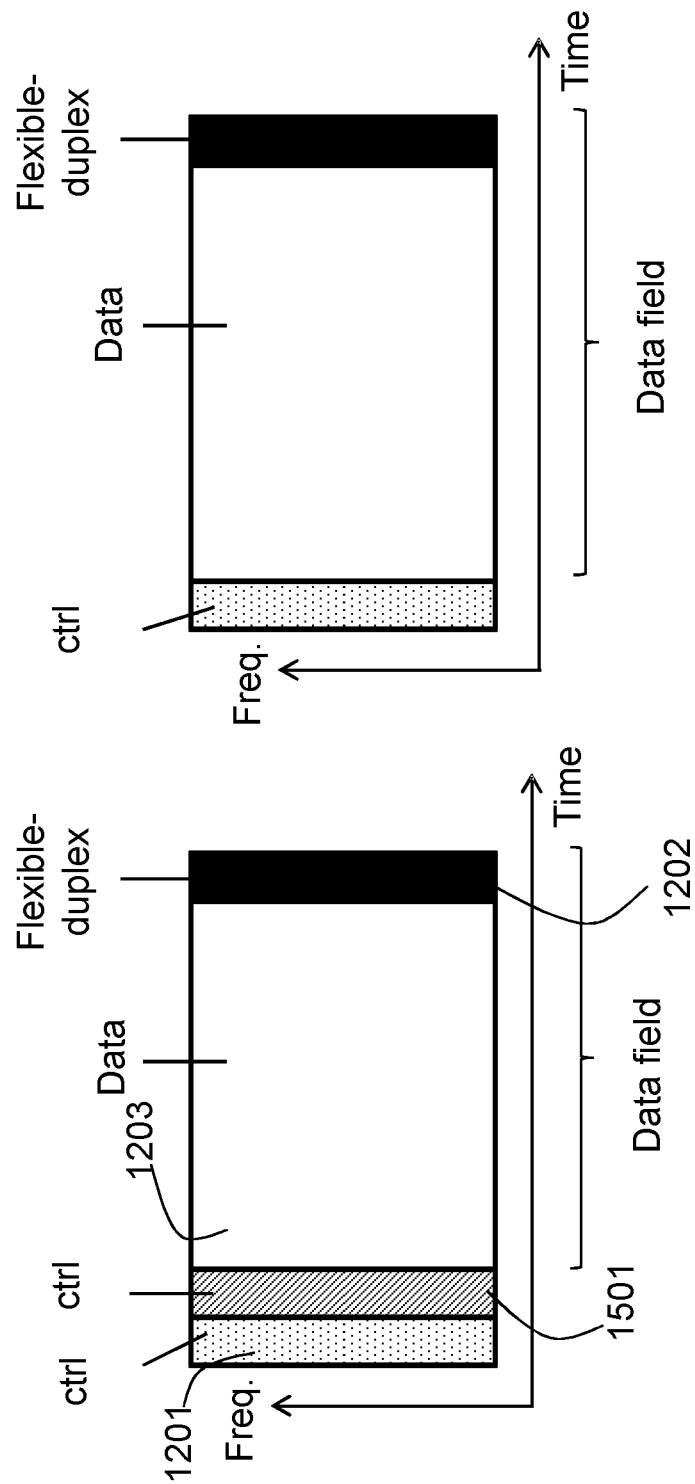
FIG. 16 is a further schematic diagram depicting example of frame structures according to embodiments herein.

FIG. 16 shows other examples according to embodiments herein, wherein the data field may further comprise control information, as shown e.g. in FIG. 16 with the black fields, in a control field which may be assigned or allocated for e.g. control information transmission to or reception from additional communication nodes, e.g. to the one or more third communication nodes 513. That is, the second set of time-frequency resources 1202 corresponds in these examples to the last occurring time-frequency resources in the frame 1200, and is the subset of time-frequency resources in the third set of time-frequency resources 1203, according to Action 1302. In these examples, the second set of time-frequency resources 1202 is the set of time frequency resources with the switched direction, and it is therefore also referred to herein as a flexible duplex field. The example on the left has the fourth set of time-frequency resources 1501, comprising control information, whereas the example on the right does not.

An advantage of embodiments herein is that they enable communications nodes in a network with half-duplex restrictions to efficiently exchange control signaling with each other.

Figure 17:
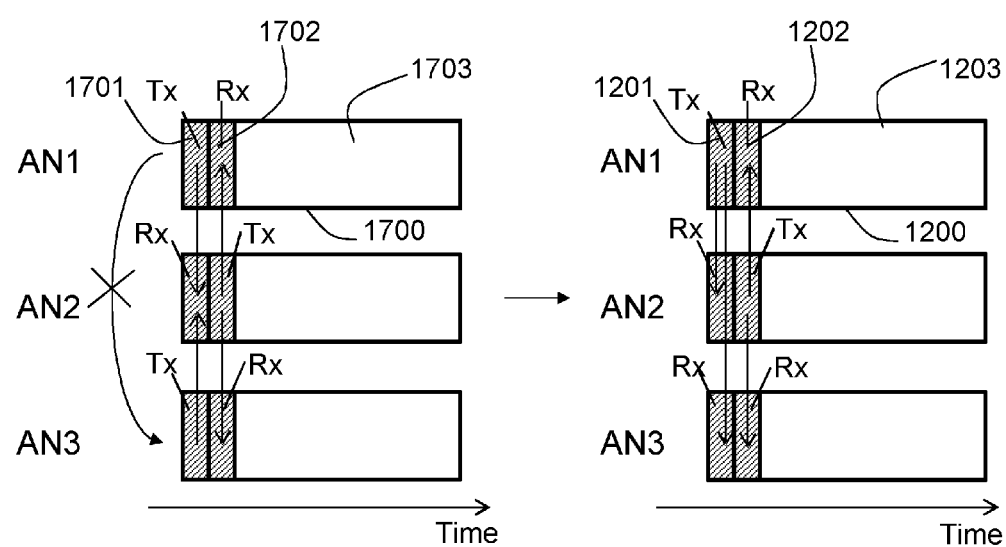
FIG. 17 is a schematic diagram illustrating an example of a comparison of embodiments herein, right side, with existing methods, left side.

FIG. 17 is a schematic diagram illustrating an example of an effect that may be achieved with a method in the first communication node 511, according to an embodiment herein, right side, in comparison with an example of an existing method, left side. An exemplary frame is represented for each one of the nodes in the left, 1700, and right, 1200, diagrams. In particular, FIG. 17 illustrates, with a particular example, how embodiments herein may provide for a way for three ANs, AN1, AN2 and AN3, to communicate with each other, in a context where the first and the second set of time-frequency resources 1201, 1202 have, ordinarily, a fixed assignment for the direction of communication. The schematic diagram on the left illustrates such a scenario according to existing methods. AN1 and AN3 have fixed assignments of transmission for the first set of time-frequency resources 1701, the one on the left, while the AN2 has a fixed assignment of reception. AN1 and AN3 have fixed assignments of reception for the second set of time-frequency resources 1702, the one on the right, while the AN2 has a fixed assignment of transmission. Under such fixed assignment, AN1 cannot transmit to AN3 through the first set of time-frequency resources 1701 and the second set of time-frequency resources 1702, as indicated with the crossed arrow. This is because AN1 and AN3 transmit both at the same time, or receive both at the same time. The schematic diagram on the right illustrates a similar scenario, according to an embodiment herein, wherein AN3 corresponds to the first network node 511, AN2 corresponds to one second communication node 512 of the one or more second communication nodes 512, and AN1 corresponds to one third communication node 513 of the one or more third communication nodes 513. AN1 has a fixed assignment of transmission for the first set of time-frequency resources 1201, while AN2 has a fixed assignment of reception. AN1 and AN3 have fixed assignments of reception for the 35 second set of time-frequency resources 1202, while the AN2 has a fixed assignment of transmission. Thanks to the flexible first set of time-frequency resources 1201, AN3 has switched the direction of communication in the first set of time-frequency resources 1201, so that AN3 may now receive the transmission from AN1.

Figure 18:
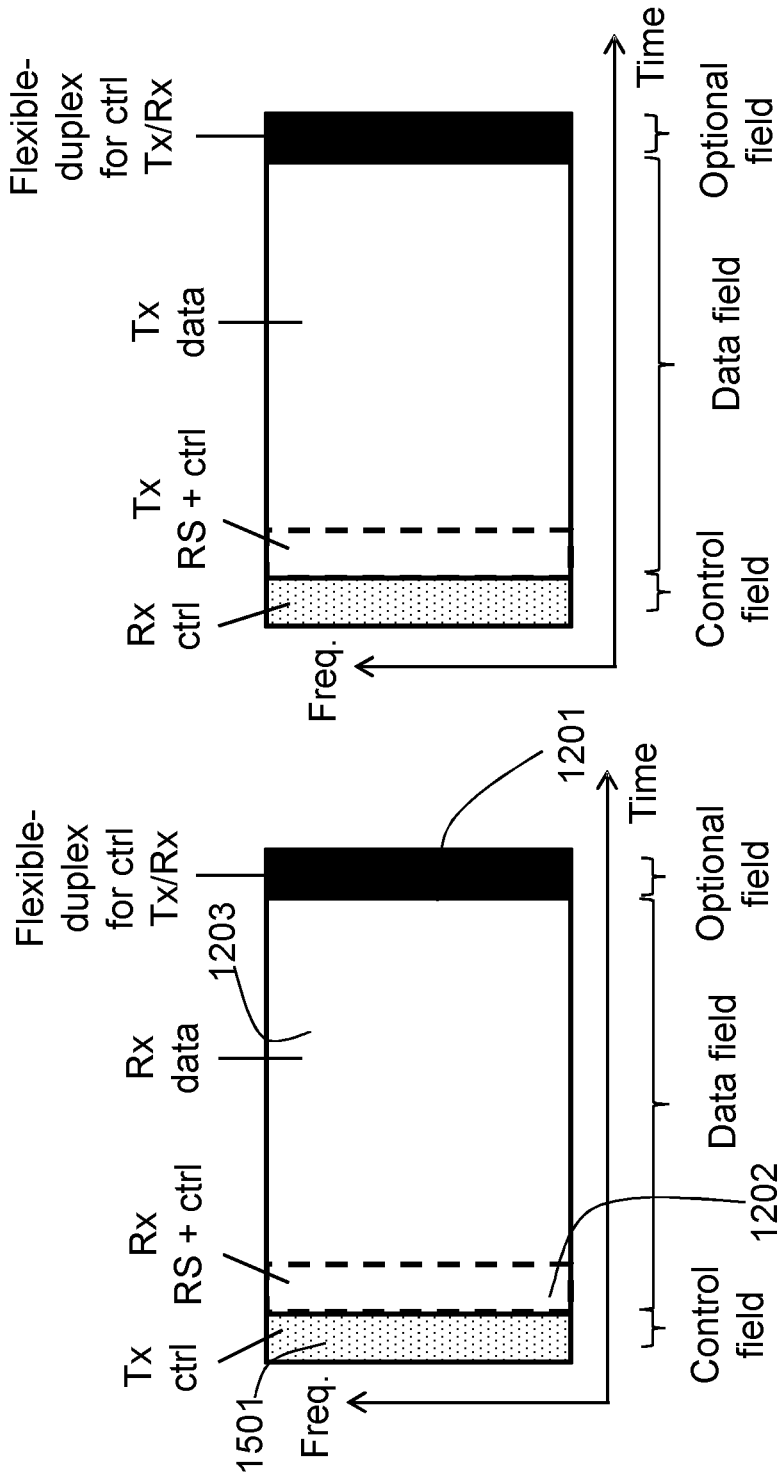
FIG. 18 is another schematic diagram depicting examples of frame structures according to embodiments herein.

FIG. 18 shows another example according to embodiments herein, wherein the first set of time-frequency resources 1201 correspond to the last occurring time-frequency resources in the frame 1200 and are the set of time frequency resources with the switched direction. This is why the first set of time-frequency resources 1201 are indicated as the Flexible duplex field. The second set of time-frequency resources 1202 is the subset of time-frequency resources in the third set of time-frequency resources 1203, as represented in the Figure by the dashed lines. In the examples of FIG. 18, each frame 1200 depicted has a fourth set of time-frequency resources 1501, delimited by the dotted pattern. In some embodiments, the first set of time-frequency resources 1201 are referred to as an "optional control field", which is the blackened field or fully filled field in FIG. 18. This is because the first set of time frequency resources 1201 may not be used in every frame 1200. In some embodiments, when there is no data to transmit/receive, the data-subfield and/or the optional control field may be used for control signal exchange if needed. As stated earlier, the first set of time-frequency resources 1201 are assigned or allocated for transmission or reception of e.g. reference signal and/or control information to or from additional nodes, such as, the one or more third communication nodes 513. This one optional control field may be said to be in a predefined time slot, and may also be referred to as a flexible-duplex for reference signal and/or control information.

A further advantage of embodiments herein is that a more implementation and cost efficient approach is provided by having a common structure for TDD, FDD and full-duplex, i.e. transmitting or receiving on the same frequency at the same time. The latter is sometime also referred to as e.g. single channel full-duplex. This is illustrated in FIGS. 19-22, which are described below.

FIGS. 19-22 show examples of consecutive transmission for TDD, TDD with multi-nodes, FDD and full duplex, on the same frequency, respectively, with use of the same frame 1200 structure according to embodiments of the method performed by the first communication node 511.

FIG. 19 illustrates a straight-forward TDD transmission/reception between two communication nodes, such as the first communication node 511, represented as Node 1, and one second communication node 512 of the one or more second communication nodes 512, represented as Node 2, which in this example is the same node as the third communication node 513. Note that the reception feedback may be sent in the control field corresponding here to the fourth set of time frequency resources 1501, the subfield of the data field, corresponding here to the second set of time frequency resources 1202 and/or the optional field, corresponding here to the first set of time frequency resources 1201, and which has a switched direction of communication with respect to a prior direction of communication assignment, not shown. In the last case, the transmission and feedback may be done within the same subframe 1200. Note that the direction of communication in the third set of time-frequency resources 1203 in each of the Node 1 and Node 2, is different every third frame. In other words, FIG. 19 shows an example of transmission and reception of multiple subframes 1200, or frames 1200, for TDD. Here, a communication node may be a base station, an access node (AN) or a user equipment.

FIG. 20 illustrates a three TDD nodes communication, such as among the first communication node 511, represented as Node 1, one second communication node 512 of the one or more second communication nodes 512, represented as Node 2, and the third communication node 513, represented as Node 3. In other words, FIG. 20 shows an example of transmission and reception of multiple subframes 1200, or frames 1200, for TDD for more than two communication nodes. Note that the direction of communication in the third set of time-frequency resources 1203 in each of the Node 1, Node 2 and Node 3, is different every third frame.

Figure 21:
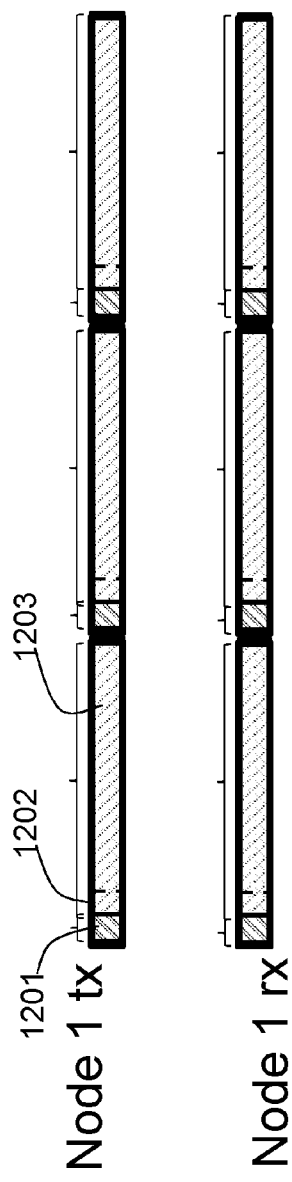
FIG. 21 is a schematic diagram illustrating examples of consecutive transmission for FDD with use of the same frame structure according to embodiments herein.

FIG. 21 illustrates a straight-forward FDD node, such as the first communication node 511, represented as Node 1. Node 1 tx indicates the frames 1200 in the frequency used for tx. Node 1 rx indicates the frames 1200 in the frequency used for rx. In other words, FIG. 21 shows an example of transmission and reception of multiple subframes 1200, or frames 1200, for FDD.

Figure 22:
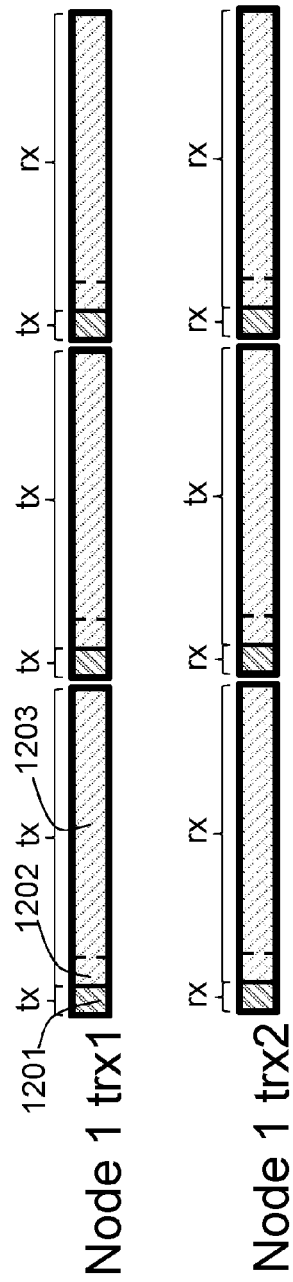
FIG. 22 is a schematic diagram illustrating examples of consecutive transmission for FDD and full duplex, on the same frequency, with use of the same frame structure according to embodiments herein.

FIG. 22 illustrates a full-duplex node, such as the first communication node 511, represented as Node 1, with two transceivers, trx1 and trx2, which may be dynamically used for transmission and reception at the same time, or both receive or both transmit depending on needs. In other words, FIG. 22 shows examples of transmission and reception of multiple subframes 1200, or frames 1200, and full-duplex on the same frequency at the same time, also called single-channel full-duplex. Note that the direction of communication in the third set of time-frequency resources 1203 is different every third frame for the trx1, and every other frame for trx2.

Since these all have the same frame 1200 structure with control and reference signal transmission in the same time period, it is easier to design reference signals and control sequence that all these transmission modes may use in the same frequency with local synchronization.

Yet a further advantage of some embodiments herein is that by having a communication node, such as the first communication node 511, as described in the embodiments herein, a single carrier modulation for data and multi-carrier modulation for reference signal and/or control information may be achieved. This may lead to low PAPR for data transmissions and efficient resource utilization of transmission resources for transmission of reference signal and/or control information. In other words, some embodiments herein will increase spectral efficiency by enabling the first network node 511 to transmit/receive control information and reference signals in the same e.g., symbol, as they may be transmitted as independent signals, as opposed to having to use more resource in terms of an additional wait symbol. Some embodiments herein will also increase flexibility, as the direction of communication may be switched as needed. Increased spectral efficiency and flexibility may be applicable for a combination of multi-user access, high-gain beamforming and wireless backhauling, while maintaining a low hardware cost low by keeping the PAPR low.

Figure 23:
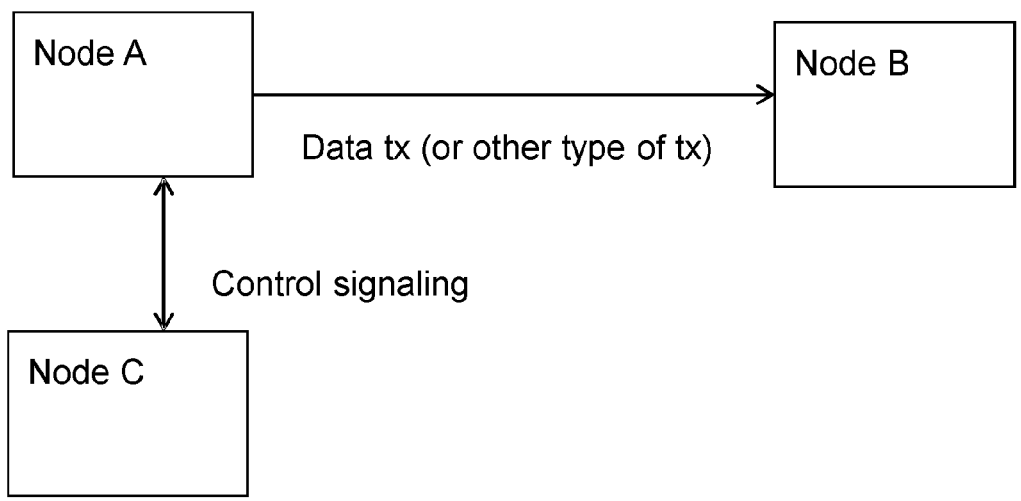
FIG. 23 is a schematic diagram illustrating actions of a method in a first communication node, according to some embodiments.

FIG. 23 is a schematic diagram illustrating a communication example where embodiments herein may be used, wherein a Node A, such as the first communication node 511 is a current communication partner with Node B, such as the second communication node 512. In particular, Node A transmits data to the Node B. Node A may also transmit or receive control information, that is, it may exchange control signalling with a Node C, such as the third communication node 513.

Figure 24:
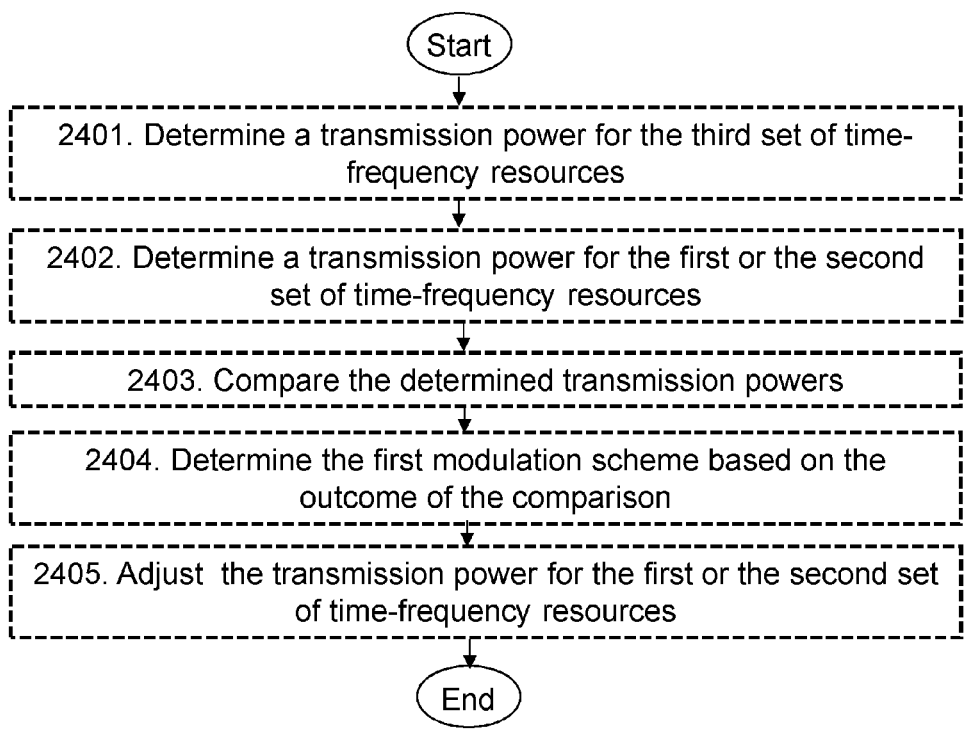
FIG. 24 is a schematic diagram illustrating embodiments of a method in a first communication node, according to some embodiments.

FIG. 24 illustrates an example of actions or operations which may be taken by the first communication node 511 as part of modulating the reference signal and/or control information in at least one of the first set of time-frequency resources 1201 and the second set of time-frequency resources 1202 according to a first modulation scheme, i.e. Action 1303. As mentioned earlier, according to some embodiments, and to have additional flexibility in the control channel, a MCM may be used. This may however result in a high PAPR. In order to keep the PAPR low, power back-off may be applied to the control field/s. To determine what modulation is to be used in the control field, the possibility of applying the pure MCM may be checked by first comparing the power that may be needed for the control part and the data part. For this purpose, the modulating the reference signal and/or control information in at least one of the first set of time-frequency resources 1201 and the second set of time-frequency resources 1202 according to the first modulation scheme, of Action 1303, may further comprise the following actions.

Action 2401

The first network node 511 may determine a transmission power for the third set of time-frequency resources 1203, that is, the data part.

Action 2402

The first network node 511 may determine a transmission power for the at least one of the first set of time-frequency resources 1201 and the second set of time-frequency resources 1202, that is, the control part.

Action 2403

Since the third set of time-frequency resources may be transmitted with a single carrier scheme, for which there may be a deterministic power budget which may be served as a metric to decide the control fields on which multiple signals may need to be transmitted, in this action, the first network node 511 may compare the determined transmission power for the at least one of the first set of time-frequency resources 1201 and the second set of time-frequency resources 1202, and the determined transmission power for the third set of time-frequency resources 1203.

Action 2404

Figure 7:
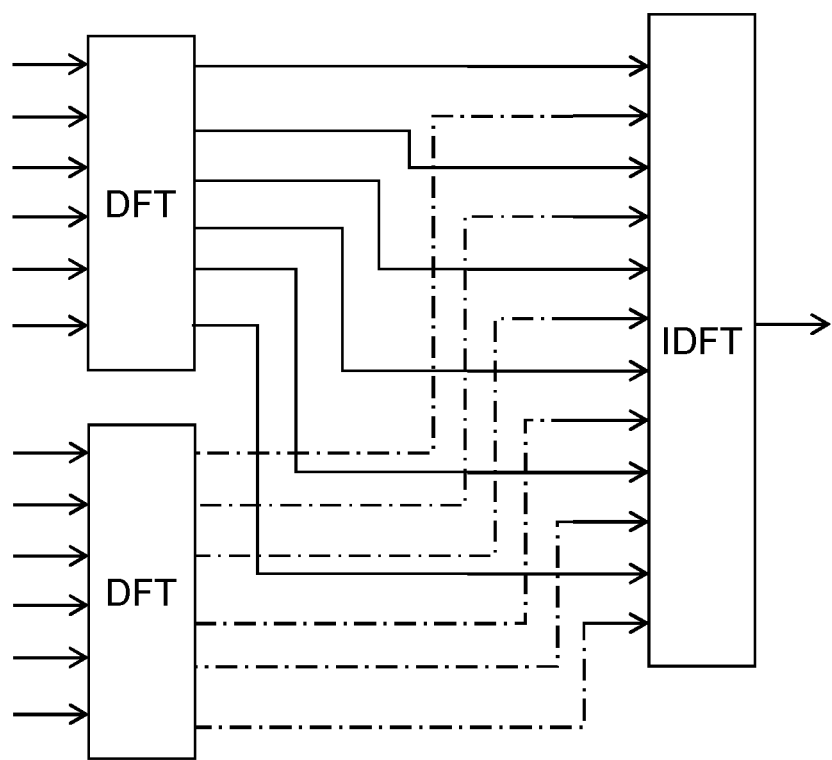
FIG. 7 is another schematic diagram depicting an example of interleaved DFT-spread OFDM.
Figure 8:
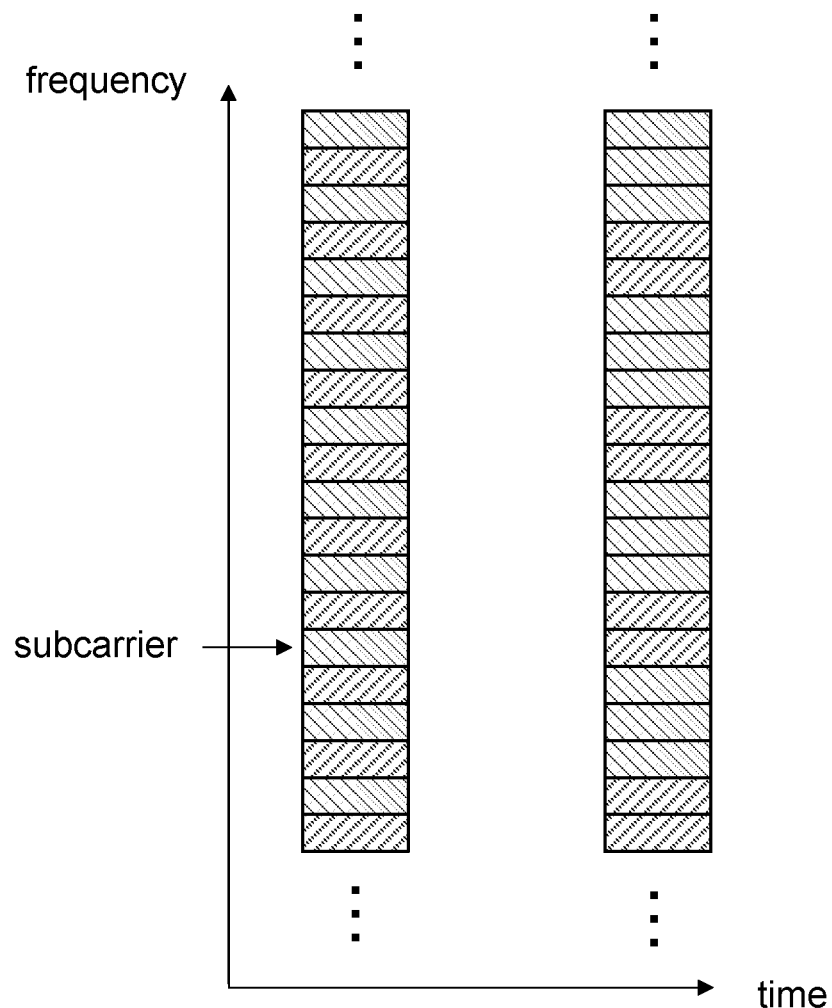
FIG. 8 is a schematic diagram depicting an example of interleaved FDM.

The first network node 511 may determine the first modulation scheme based on the outcome of the comparison of the comparing of Action 2403. For example, the first communication node 511 may determine to use a MCM in case the determined transmission power for the at least one first set of time-frequency resources 1201 is lower than the determined transmission power for the second set of time-frequency resources 1202, e.g. by a predefined value. In the other case, i.e. when the determined transmission power for the at least one first set of time-frequency resources 1201 is not lower than the determined transmission power for the second set of time-frequency resources 1202, e.g., by a predefined value, another modulation scheme may be selected which has a low PAPR, e.g. interleaved DFTS-OFDM, as illustrated in FIG. 7.

Action 2405

In order to keep the PAPR low, the first network node 511 may use power back-off to avoid power saturation when needed, depending for example on the determined modulation scheme in Action 2404. Hence, in this Action, the first network node 511 may, adjust the transmission power for the at least one first set of time-frequency resources 1201 and the second set of time-frequency resources 1202 below a determined threshold in order to reduce power saturation. In this case, the first communication node 511 may adjust the transmission power based on the outcome of the comparison of the transmission powers.

Figure 25:
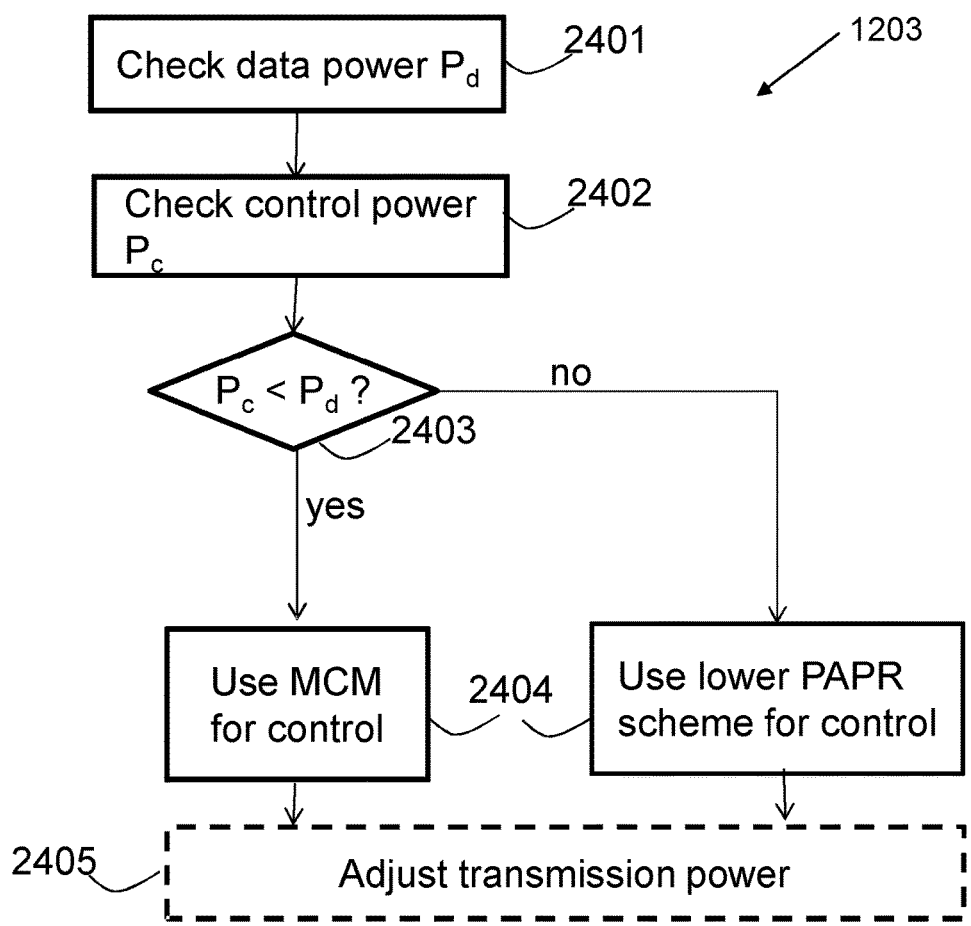
FIG. 25 is a is another flowchart depicting embodiments of a method in the first communication node, according to some embodiments.

FIG. 25 is a schematic diagram representing the actions of FIG. 24. In FIG. 25, the transmission power for the third set of time-frequency resources 1203 is represented as $P_d$. The transmission power for the at least one of the first set of time-frequency resources 1201 and the second set of time-frequency resources 1202 is represented as $P_c$. In the example of FIG. 25, the determining of the first modulation scheme of Action 2404 is done between a modulation scheme which is an MCM and a modulation scheme that is a low PAPR modulation scheme.

To perform at least some of the method actions described above in relation to FIGS. 11-25, the first communication node 511 is configured to perform any one of transmission and reception in at least one of: the first set of time-frequency resources 1201 in the frame 1200 of time-frequency resources, and the second set of time-frequency resources 1202 in the frame 1200. The first and the second set of time-frequency resources 1201, 1202 in the frame 1200 are reserved for communication of the reference signal and/or control information in the pre-arranged direction. The direction of communication is one of: transmission and reception to or from the one or more second communication nodes 512. The first communication node 511 may comprise the following arrangement depicted in FIG. 26. As already mentioned, the first communication node 511 and the one or more second communication nodes 512 are configured to operate in the communications network 500.

The detailed description of some of the following corresponds to the same references provided above, in relation to the actions described for the first communication node 511, and will thus not be repeated here.

For example, the first communication 511 node may be the wireless device 121 or the network node 110 in the wireless communication network 100.

The first communication node 511 is further configured to, e.g., by means of a determining module 2601 configured to, determine that the direction of communication of at least one of the first and second set of time-frequency resources 1201, 1202 is to be switched for at least one frame 1200 to the determined switched direction.

The determining module 2601 may be a processor 2606 of the first communication node 511.

In some embodiments, the determined switched direction corresponds to the pattern.

In some embodiments, the determined switched direction is one of: the pre-agreed direction with the one or more second communication nodes 512, and the autonomously determined switched direction.

In some embodiments, the set of time-frequency resources determined to switch communication direction is configured to be determined based on one of: pseudo-random, prearranged and based on a current time.

In some embodiments, the at least one frame 1200 further comprises a third set of time-frequency resources 1203 used for transmission or reception of data.

The first communication node 511 may be further configured to, e.g., by means of the determining module 2601 configured to, determine that the second set of time-frequency resources 1202 is the subset of time-frequency resources in the third set of time-frequency resources 1203, wherein the subset of time-frequency resources is to comprise reference signal and/or control information to be transmitted or received in the same direction as the data in time-frequency resources in the third set of time-frequency resources 1203.

The first communication node 511 is further configured to, e.g., by means of a performing module 2602 configured to, perform one of transmission or reception of control information in the at least one of the first and second set of time-frequency resources 1201, 1202 according to the determined switched direction to or from, one or more third communication nodes 513 configured to operate in the communications network 500.

The performing module 2602 may be the processor 2606 of the first communication node 511.

In some embodiments, to perform may further comprise to perform transmission or reception of the reference signal and/or control information in at least one subset of the first set of time-frequency resources 1201 and/or the subset of time-frequency resources in the third set of time-frequency resources 1203 to or from the one or more third communication nodes 513.

In some embodiments, the at least one frame 1200 may further comprise the third set of time-frequency resources 1203 used for transmission or reception of data. The first communication node 511 may be further configured to, e.g., by means of a modulation module 2603 configured to, modulate the reference signal and/or control information in at least one of the first set of time-frequency resources 1201 and the second set of time-frequency resources 1202 according to the first modulation scheme, wherein the first modulation scheme is capable of simultaneous transmissions of multiple independent signals.

The modulation module 2603 may be the processor 2606 of the first communication node 511.

The first communication node 511 may be further configured to, e.g., by means of the modulation module 2603 configured to, modulate the data in the third set of time-frequency resources 1203 according to the second modulation scheme, wherein the second modulation scheme is a different modulation scheme than the first modulation scheme.

In some embodiments, the reference signal and/or control information in the subset of time-frequency resources in the third set of time-frequency resources 1203 is configured, e.g., by means of the modulation module 2603 configured to, to be modulated using one of: a) a different modulation scheme than the data in the time-frequency resources in the third set of time-frequency resources 1203, and b) the same modulation scheme as the control information in the first set of time-frequency resources 1201, wherein the used modulation scheme is one of: a multi-carrier modulation scheme, or a single-carrier modulation scheme.

In some embodiments, the subset of time-frequency resources in the third set of time-frequency resources 1203 corresponds to the first occurring time-frequency resources in the third set of time-frequency resources 1203.

In some embodiments, the second set of the time-frequency resources in the frame 1200 corresponds to the last occurring time-frequency resources in the frame 1200.

In some embodiments, to modulate the reference signal and/or control information in at least one of the first set of time-frequency resources 1201 and the second set of time-frequency resources 1202 according to the first modulation scheme further comprises to: a) determine the transmission power for the third set of time-frequency resources 1203; b) determine the transmission power for the at least one of the first set of time-frequency resources 1201 and the second set of time-frequency resources 1202; c) compare the determined transmission power for the at least one of the first set of time-frequency resources 1201 and the second set of time-frequency resources 1202, and the determined transmission power for the third set of time-frequency resources 1203, and d) determine the first modulation scheme based on the outcome of the comparison.

In some embodiments, to modulate the reference signal and/or control information in at least one of the first set of time-frequency resources 1201 and the second set of time-frequency resources 1202 according to the first modulation scheme further comprises to: adjust the transmission power for the at least one first set of time-frequency resources 1201 and the second set of time-frequency resources 1202 below the determined threshold in order to reduce power saturation.

In some embodiments, to modulate further comprises to provide in the first modulation scheme the more robust channel coding than provided in the second modulation scheme.

The first communication node 511 may be further configured to, e.g., by means of a transmitting module 2604 configured to, transmit a) the modulated reference signal and/or control information in the one of the first set of time-frequency resources 1201 and the second set of time-frequency resources 1202 the direction of communication of which is not to be switched, and b) the modulated data in the third set of time-frequency resources 1203 to at least one second communication node 512 of the one or more second communication nodes 512, wherein to perform one of transmission or reception of control information comprises transmission of the modulated reference signal and/or control information in the at least one first set of time-frequency resources 1201 and the second set of time-frequency resources 1202 to the one or more third communication nodes 513 configured to operate in the communications network 500.

The transmitting module 2604 may be the processor 2606 of the first communication node 511.

Figure 26:
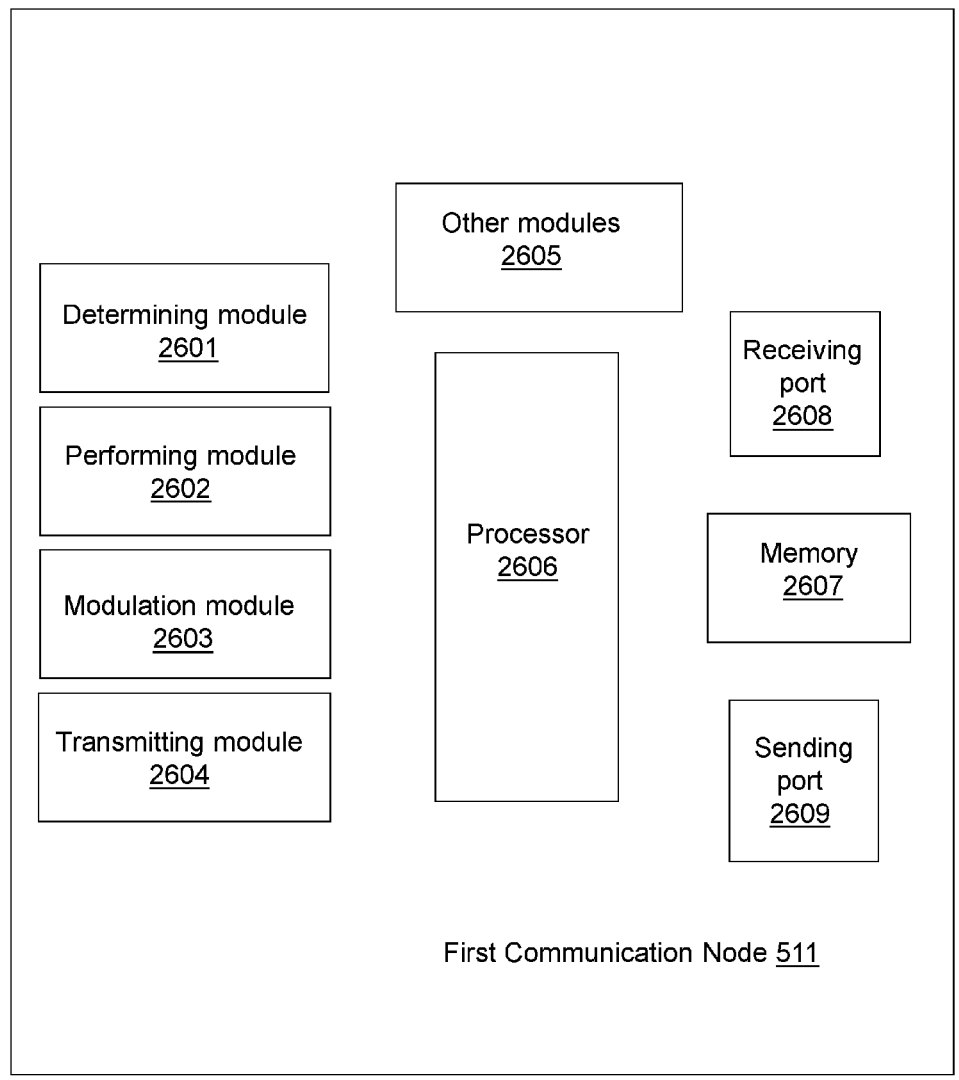
FIG. 26 is a block diagram of a first communication node that is configured according to some embodiments.

The embodiments herein may be implemented through one or more processors, such as the processor 2606 in the first communication node 511 depicted in FIG. 26, together with computer program code for performing the functions and actions of the embodiments herein. The program code mentioned above may also be provided as a computer program product, for instance in the form of a data carrier carrying computer program code for performing the embodiments herein when being loaded into the in the first communication node 511. One such carrier may be in the form of a CD ROM disc. It is however feasible with other data carriers such as a memory stick. The computer program code may furthermore be provided as pure program code on a server and downloaded to the first communication node 511. As indicated above, the processor 2606 may comprise one or more circuits, which may also be referred to as one or more modules in some embodiments, each configured to perform the actions carried out by the first communication node 511, as described above in reference to FIGS. 11-25, e.g., the determining module 2601, the performing module 2602, the modulation module 2603, the transmitting module 2604, and other modules 2605. Hence, in some embodiments, determining module 2601, the performing module 2602, the modulation module 2603, the transmitting module 2604, and other modules 2605, described above may be implemented as one or more applications running on one or more processors such as the processor 2606. That is, the methods according to the embodiments described herein for the first communication node 511 may be respectively implemented by means of a computer program product, comprising instructions, i.e., software code portions, which, when executed on at least one processor, cause the at least one processor to carry out the actions described herein, as performed by the first communication node 511. The computer program product may be stored on a computer-readable storage medium. The computer-readable storage medium, having stored thereon the computer program, may comprise instructions which, when executed on at least one processor, cause the at least one processor to carry out the actions described herein, as performed by the first communication node 511. In some embodiments, the computer-readable storage medium may be a non-transitory computer-readable storage medium, such as a CD ROM disc, or a memory stick. In other embodiments, the computer program product may be stored on a carrier containing the computer program, wherein the carrier is one of an electronic signal, optical signal, radio signal, or the computer-readable storage medium, as described above.

The first communication node 511 may further comprise a memory 2607 comprising one or more memory units. The memory 2607 may be arranged to be used to store obtained information, such as the information received by the processor 2606, store data configurations, schedulings, and applications etc. . . . to perform the methods herein when being executed in the first communication node 511 and/or any information used by such applications or programs. Memory 2607 may be in communication with the processor 2606. Any of the other information processed by the processor 2606 may also be stored in the memory 2607.

In some embodiments, information e.g., from any of the one or more second communication nodes 512 and the third communication node 513, may be received through a receiving port 2608 or receiver RX. The receiving port 2608 may be in communication with the processor 2606. The receiving port 2608 may also be configured to receive other information or signals.

The processor 2606 may be further configured to send messages, e.g., to any of the one or more second communication nodes 512 and the third communication node 513, through a sending port 2609 or transmitter TX, which may be in communication with the processor 2606, and the memory 2607.

The first communication node 511 may further comprise an input/output interface, not shown, which may be used to communicate over a wired connection with other radio network entities or nodes in the wireless communications network 100.

Those skilled in the art will also appreciate that the any module within the first communication node 511, e.g., determining module 2601, the performing module 2602, the modulation module 2603, the transmitting module 2604, and other modules 26 described above, may refer to a combination of analog and digital circuits, and/or one or more processors configured with software and/or firmware, e.g. stored in the memory, that when executed by the one or more processors such as the processor 2606, perform actions as described above, e.g., in relation to any of FIGS. 11 and 24. One or more of these processors, as well as the other digital hardware, may be included in a single application-specific integrated circuitry (ASIC), or several processors and various digital hardware may be distributed among several separate components, whether individually packaged or assembled into a system-on-a-chip (SoC). As will be readily understood by those familiar with communications design, that functions from other circuits may be implemented using digital logic and/or one or more microcontrollers, microprocessors, or other digital hardware. Several of the functions may be implemented on a processor shared with other functional components of a wireless terminal or network node, for example.

Alternatively, several of the functional elements of processing circuits discussed may be provided through the use of dedicated hardware, while others are provided with hardware for executing software, in association with the appropriate software or firmware. Thus, the term "processor" or "controller" as may be used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of communications receivers will appreciate the cost, performance, and maintenance tradeoffs inherent in these design choices. The different actions taken by the different nodes may be implemented with different circuits.

The terminology used in the detailed description of the particular embodiments illustrated in the accompanying drawings is not intended to be limiting of the described communication node or method therein.

As used herein, the term "and/or" comprises any and all combinations of one or more of the associated listed items. Further, as used herein, the common abbreviation "e.g.", which derives from the Latin phrase "exempli gratia," may be used to introduce or specify a general example or examples of a previously mentioned item, and is not intended to be limiting of such item. If used herein, the common abbreviation "i.e.", which derives from the Latin phrase "id est," may be used to specify a particular item from a more general recitation. The common abbreviation "etc.", which derives from the Latin expression "et cetera" meaning "and other things" or "and so on" may have been used herein to indicate that further features, similar to the ones that have just been enumerated, exist.

As used herein, the singular forms "a", "an" and "the" are intended to comprise also the plural forms as well, unless expressly stated otherwise. It will be further understood that the terms "includes," "comprises," "including" and/or "comprising," when used in this specification, specify the presence of stated features, actions, integers, steps, operations, elements, and/or components, but do not preclude the presence or addition of one or more other features, actions, integers, steps, operations, elements, components, and/or groups thereof. That is, when using the word "comprise" or "comprising" it shall be interpreted as non-limiting, i.e. meaning "consist at least of".

Unless otherwise defined, all terms comprising technical and scientific terms used herein have the same meaning as commonly understood by one of ordinary skill in the art to which the described embodiments belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The embodiments herein are not limited to the above described preferred embodiments. Various alternatives, modifications and equivalents may be used. Therefore, the above embodiments should not be taken as limiting the scope of the invention, which is defined by the appending claims.

Further description of particular examples related to embodiments herein, which may be combined with any of the embodiments just described:

First Group of Related Examples

Several examples are comprised herein. More specifically, the followings are communication node related examples:

The communication node examples relate to FIGS. 27, 28, 13, 27, 23 and 29.

Figure 27:
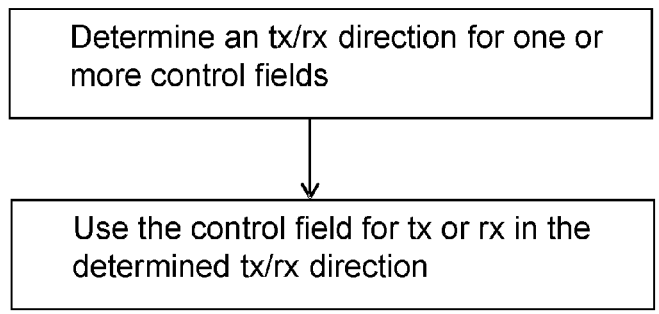
FIG. 27 is a schematic diagram illustrating actions of a method in a first communication node, according to some examples.

The example depicted in FIG. 27 relates to a method in a communication node for determining a tx/rx direction for one or more control fields, and using the control field for tx or rx in the determined tx/rx direction.

Figure 28:
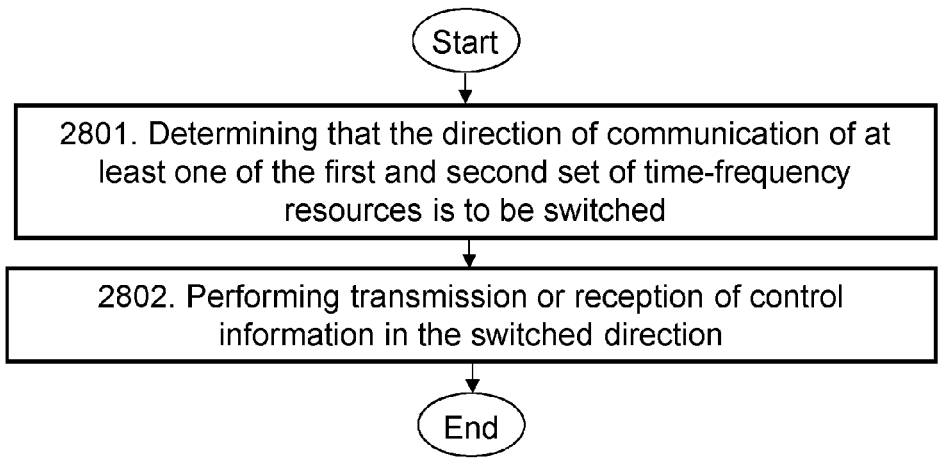
FIG. 28 is a schematic diagram illustrating actions of a method in a first communication node, according to some examples.
Figure 29:
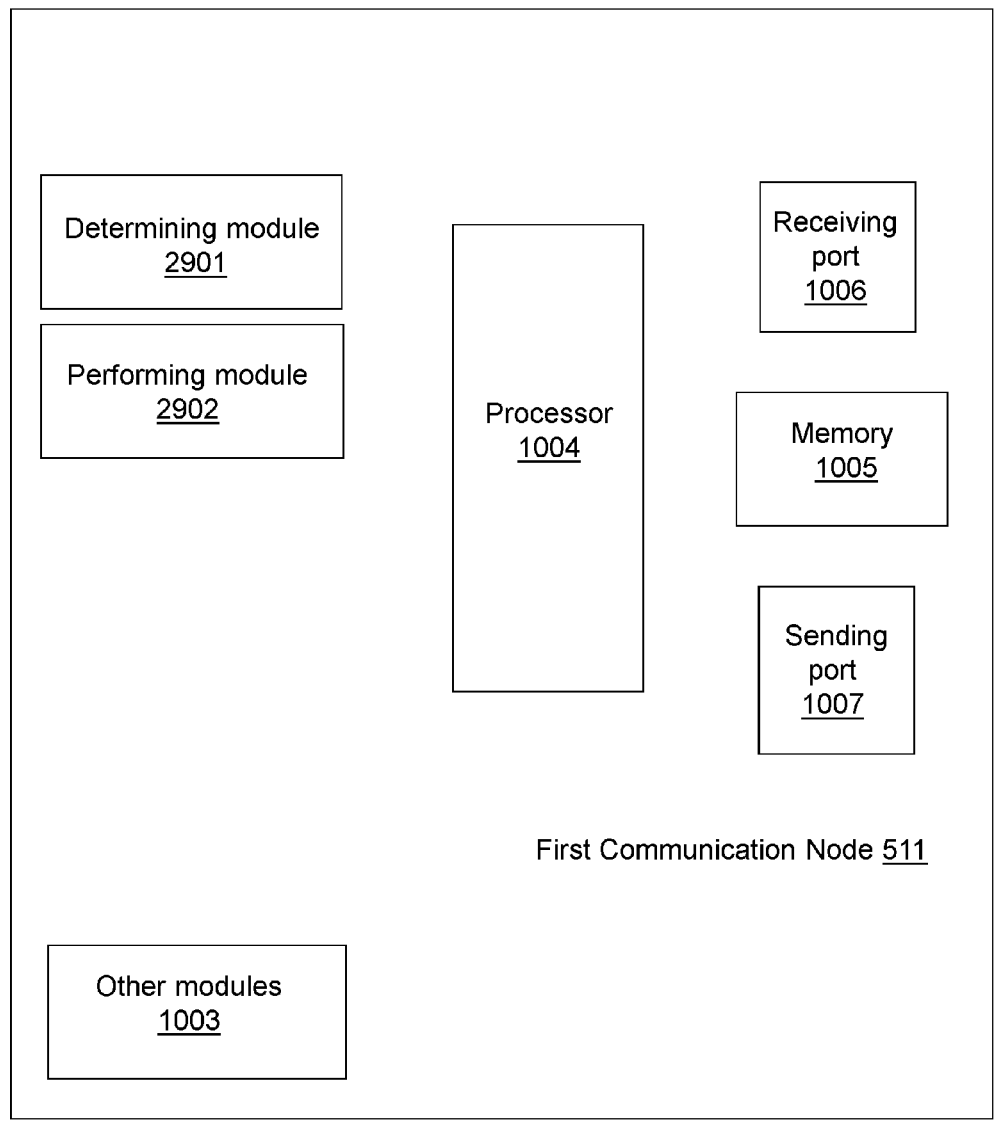
FIG. 29 is a block diagram of a first communication node that is configured according to some embodiments.

The communication node examples relating to FIGS. 28, 13, 27, 23 and 29 relate to a method performed by a communication node such as the first communication node 511 for performing any one of: transmission and reception, in at least one of: the first set of time-frequency resources 1201 in the frame 1200 of time-frequency resources, and the second set of time-frequency resources 1202 in the frame 1200, wherein the first and the second set of time-frequency resources 1201, 1202 in the frame 1200 are reserved for communication of control information in a pre-arranged direction, the direction of communication being one of: transmission and reception. With reference to FIG. 28, the first communication node 511 operating in the communications network 500, may comprise the actions of:

a) Determining 2801 that the direction of communication of at least one of the first and second set of time-frequency resources 1201, 1202 is to be switched for at least one frame 1200. This action 601 may be performed by a determining module 2901 within the communication node such as the first communication node 511;

b) Performing 2802 one of transmission or reception of control information in the at least one of the first and second set of time-frequency resources 1201, 1202 according to the determined switched direction to or from, respectively, one or more third communication nodes 513 operating in the communications network 500. This action 602 may be performed by a performing module 2902 within the communication node such as the first communication node 511.

To perform any of the method actions described above in relation to FIGS. 28, 13, 27, 23, the first communication node 511 may be configured to perform any of the above actions, e.g., by means of the respective mentioned modules 2801-2802.

The first communication node 511 may comprise an interface unit to facilitate communications between the first communication node 511 and other nodes or devices, e.g., UEs. The interface may, for example, include a transceiver configured to transmit and receive radio signals over an air interface in accordance with a suitable standard.

In some embodiments, the determined switched direction is transmission, and the determining 201 that the direction of communication of at least one of the first and second set of time-frequency resources 1201, 1202 is to be switched is only performed when there is control information to transmit.

In some embodiments all the actions may be performed. In some embodiments, one or more actions may be performed. In some embodiments, the order of the actions illustrated in FIG. 28 may be changed in one or more actions. One or more embodiments may be combined, where applicable. All possible combinations are not described to simplify the description.

Second Group of Related Examples

Other examples herein may relate to transmissions in a wireless communications network. In particular, examples herein relate to a communication node and a method therein for performing transmissions or reception in a frame 1200 of time-frequency resources in a wireless communications network. The communication node may be a wireless device or a network node in the wireless communication network.

It is an object of examples herein to improve the spectral efficiency in the wireless communication network.

According to a first aspect of embodiments herein, the object may be achieved by a method performed by the first communication node 511 for performing transmissions or reception in a frame 1200 of time-frequency resources in a wireless communications network. The frame 1200 comprises a first set of time-frequency resources 1201 used for transmission or reception of control information and a third set of time-frequency resources 1203 used for transmission or reception of data. The first communication node 511 may determine that a subset of time-frequency resources in the third set of time-frequency resources 1203 is to comprise reference signal and/or control information to be transmitted or received in the same direction as the data in time-frequency resources in the third set of time-frequency resources 1203. Then, the first communication node 511 may perform one of transmission or reception of the reference signal and/or control information in the subset of time-frequency resources in the third set of time-frequency resources 1203 to or from at least a third communication node 513.

In some embodiments, the subset of time-frequency resources in the second set of time-frequency resources 1202 comprises reference signal information interleaved with control information using precoded, or DFT-precoded, interleaved FDMA.

In some embodiments, the first communication node may perform one of transmission or reception by further performing transmission or reception of reference signal and/or control information in at least one subset of the first set of time-frequency resources 1201 and/or the subset of time-frequency resources in the second set of time-frequency resources 1202 to or from a third communication node.

According to a second and third aspect of examples herein, the object may be achieved by a wireless communication device and a network node performing the method described above, respectively.

Figure 30:
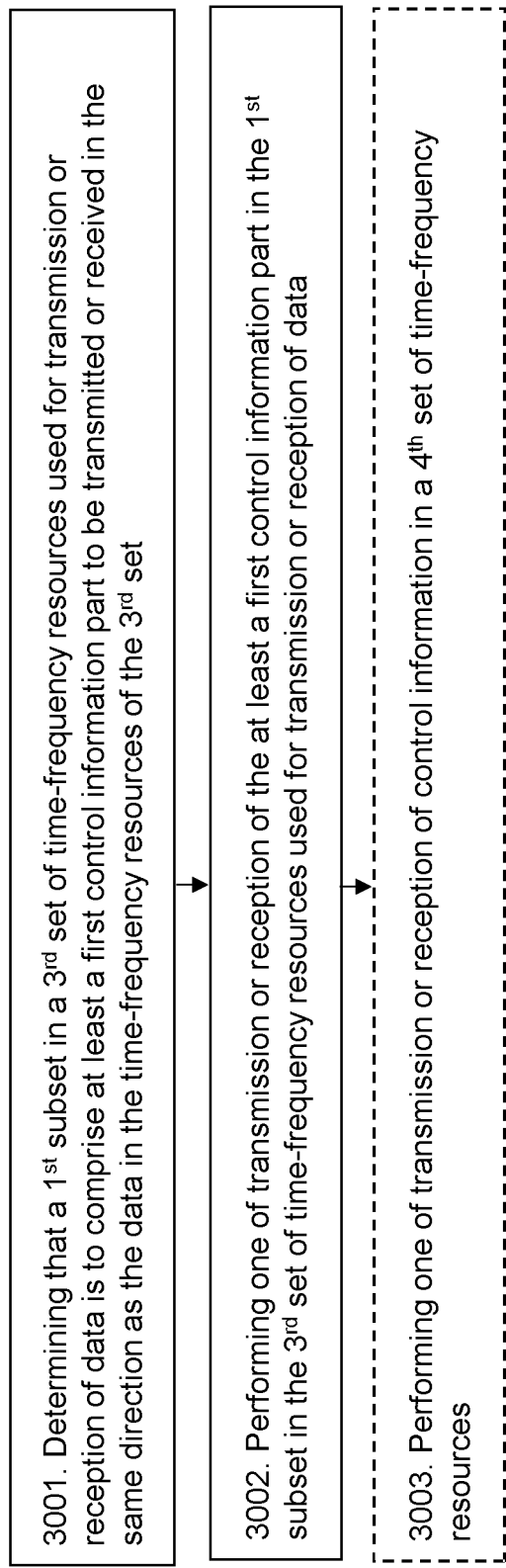
FIG. 30 is a flowchart depicting embodiments of a method in the first communication node, according to some examples.

Example of embodiments of a method performed by the first communication node 511 for performing transmissions or reception in a frame 1200 of time-frequency resources in a wireless communications network 500, will now be described with reference to the flowchart depicted in FIG. 30. FIG. 30 illustrates an example of actions or operations which may be taken by the first communication node 511.

Here, the frame 1200 comprises the first set of time-frequency resources 1201 used for transmission or reception of control information and the third set of time-frequency resources 1203 used for transmission or reception of data.

Action 3001

First, the first communication node 511 may determine that a subset of time-frequency resources in the third set of time-frequency resources 1203 is to comprise reference signal and/or control information to be transmitted or received in the same direction as the data in time-frequency resources in the third set of time-frequency resources 1203.

It may also be noted that the first communication node 110, 121 may, according to some embodiments, modulate the different fields using different modulation schemes or the same modulation scheme. Examples of modulations schemes comprise multi-carrier modulation such as OFDM, FBMC, filtered multi-tones and single-carrier schemes such as standard single carrier, pre-coded multi-carrier such as DFTS-OFDM, filter-bank-precoded FBMC, etc.

Furthermore, the first communication node 110, 121 may, in some embodiments, modulate the data in the data field may in similar way as the control field or in a different way that the control field.

Action 3002

The first communication node 511 then may perform one of transmission or reception of the reference signal and/or control information in the subset of time-frequency resources in the third set of time-frequency resources 1203 to or from at least the third communication node 513.

Also, in some embodiments, the first communication node 511 may use the control field and the data field and the optional control field, as described in Action 3003 below, to transmit to/receive from different directions and nodes, such as, additional nodes, i.e. a third communication node.

Action 3003

Optionally, the first communication node 511 may also perform one of transmission or reception of control information in a fourth set of time-frequency resources 1501. In this case, the frame 1200 may comprise a fourth set of time-frequency resources 1501 used for transmission or reception of control information and the fourth set of the time-frequency resources in the frame 1200 may correspond to the last occurring time-frequency resources in the frame 1200.

By having the first communication node 511 as described in the embodiments above corresponding to Actions 3001-3003, a frame 1200 structure is provided which is more spectral efficient in that it reserves only one control field, i.e. one set of time-frequency resources, for transmission or reception of reference signal and control information, and have another control filed, i.e. another set of time-frequency resources, being dynamically assigned/allocated for transmission or reception of reference signal and control information.

To perform the method actions herein a first communication node 511 in the form of the wireless device 121 and the network node 110 may be provided.

Figure 33:
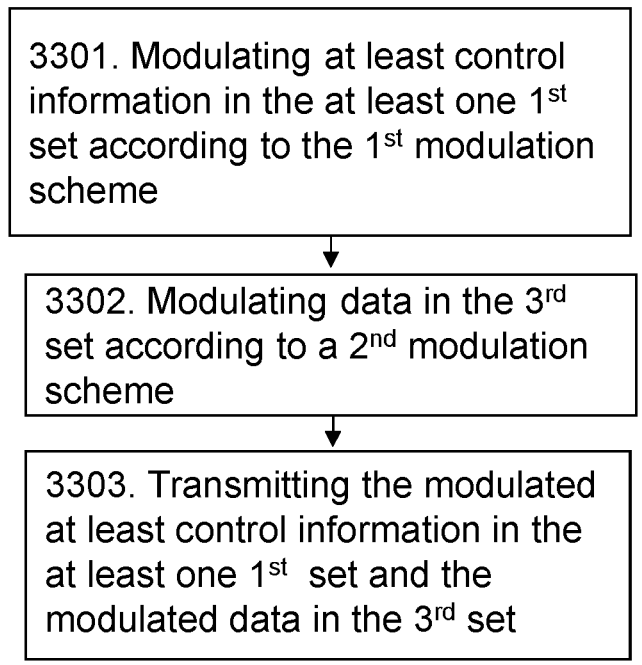
FIG. 33 is a flowchart depicting embodiments of a method in the first communication node, according to some examples.

FIGS. 33 and 34 are block diagrams depicting the wireless device 121 and the network node 110. The wireless device 121 is configured to perform the methods described for the first communication node 511 according to embodiments herein described in relation to FIG. 30. The network node 110 may also be configured to perform the methods described for the first communication node 511 according to embodiments herein.

The embodiments herein for performing transmissions or reception in a frame 1200 of time-frequency resources in a wireless communications network 500 may be implemented through one or more processors 3101 in the wireless device 121 depicted in FIG. 33, together with computer program code for performing the functions and/or method actions of the embodiments herein. The program code mentioned above may also be provided as a computer program product, for instance in the form of a data carrier carrying computer program code for performing embodiments herein when being loaded into the wireless device 121. One such carrier may be in the form of a CD ROM disc. It is however feasible with other data carriers such as a memory stick. The computer program code may furthermore be provided as pure program code on a server and downloaded to the wireless device 121.

The wireless device 121 may comprise a receiving module 3102, or receiver RX, and a transmitting module 3103, or transmitter TX, over which the wireless device 121 may transmit/receive signals to other communication nodes, such as, e.g. the network node 110 or other wireless devices or network nodes. Also, the wireless device 121 may comprise a determining module 3104 and a performing module 3105 for performing transmissions or reception in a frame 1200 of time-frequency resources in a wireless communications network 500 according to the embodiments herein.

The wireless device 121 may further comprise a memory 3106. The memory 3106 may, for example, be used to store applications or programs to perform the methods herein and/or any information used by such applications or programs.

The embodiments herein for performing transmissions or reception in a frame 1200 of time-frequency resources in a wireless communications network 100 may be implemented through one or more processors 3201 in the network node 110 depicted in FIG. 34, together with computer program code for performing the functions and/or method actions of the embodiments herein. The program code mentioned above may also be provided as a computer program product, for instance in the form of a data carrier carrying computer program code for performing embodiments herein when being loaded into the network node 110. One such carrier may be in the form of a CD ROM disc. It is however feasible with other data carriers such as a memory stick. The computer program code may furthermore be provided as pure program code on a server and downloaded to the network node 110.

The network node 110 may comprise a receiving module 3202, or receiver RX, and a transmitting module 3203, or transmitter TX, over which the network node 110 may transmit/receive signals to other communication nodes, such as, e.g. the wireless device 121 or other wireless devices or network nodes. Also, the network node 110 may comprise a determining module 3204 and a performing module 3205 for performing transmissions or reception in a frame 1200 of time-frequency resources in a wireless communications network 500 according to the embodiments herein.

The network node 110 may further comprise a memory 3206. The memory 3206 may, for example, be used to store applications or programs to perform the methods herein and/or any information used by such applications or programs.

Third Group of Related Examples

Other examples herein relate to transmissions in the wireless communications network. In particular, embodiments herein relate to the first communication node 511 and a method therein for performing transmissions or reception in the frame 1200 of time-frequency resources in the wireless communications network 500. The first communication node 511 may be a wireless device or a network node in the wireless communication network 500.

Examples herein may relate to the first communication node 511 and method therein for transmission or reception in the frame 1200 of time-frequency resources in the wireless communication network.

According to a first aspect of examples herein, the object is achieved by a method performed by the first communication node 511 for performing transmissions in a frame 1200 of time-frequency resources in a wireless communications network. The frame 1200 may comprise at least one first set of time-frequency resources 1201 used for transmission or reception of reference signal and/or control information and a third set of time-frequency resources 1203 used for transmission or reception of data. The first communication node 511 may modulate the reference signal and/or control information in the at least one first set of time-frequency resources 1201 according to a first modulation scheme, wherein the first modulation scheme is capable of simultaneous transmissions of multiple independent signals. Also, the first communication node 511 may modulate the data in the third set of time-frequency resources 1203 according to a second modulation scheme, wherein the second modulation scheme is a different modulation scheme than the first modulation scheme. Then, the first communication node 511 may transmit the modulated reference signal and/or control information in the at least one first set of time-frequency resources 1201 and the modulated data in the third set of time-frequency resources 1203 to at least the third communication node 513.

In some embodiments, the first communication node may when modulating the reference signal and/or control information in the at least one first set of time-frequency resources 1201 according to a first modulation scheme, further determine a transmission power for the third set of time-frequency resources 1203, determine a transmission power for the at least one first set of time-frequency resources 1201, compare the determined transmission power for the at least one first set of time-frequency resources 1201 and the determined transmission power for the third set of time-frequency resources 1203, and determine the first modulation scheme based on the outcome of the comparison of the comparing of the transmission powers.

In some embodiments, the the first communication node 511 may when modulating the reference signal and/or control information in the at least one first set of time-frequency resources 1201 according to a first modulation scheme, adjust the transmission power for the at least one first set of time-frequency resources 1201 below a determined threshold, e.g. in order to reduce power saturation. In this case, according to some embodiments, the first communication node may adjust the transmission power based on the outcome of the comparison of the comparing of the transmission powers.

In some embodiments, the first communication node may when modulating the reference signal and/or control information in the at least one first set of time-frequency resources 1201 according to the first modulation scheme, further provide in the first modulation scheme a more robust channel coding than provided in the second modulation scheme.

In some embodiments, the first communication node 511 may further transmit reference signal and/or control information in the at least one first set of time-frequency resources 1201 to at least the second communication node 512.

According to a second and third aspect of embodiments herein, the object is achieved by the wireless device 121 and the network node 110 performing the method described above, respectively.

Example of embodiments of a method performed by the first communication node 511 for performing transmissions or reception in the frame 1200 of time-frequency resources in the wireless communications network 500, will now be described with reference to the flowchart depicted in FIG. 32. FIG. 33 illustrates an example of actions or operations which may be taken by the first communication node 511. The first communication node 511 may in some embodiments be the wireless device 121 or the network node 110 in the wireless communications network 500.

Here, the frame 1200 comprises at least one first set of time-frequency resources 1201 used for transmission or reception of reference signal and/or control information and the third set of time-frequency resources 1203 used for transmission or reception of data.

Action 3301
First, the first communication node 511 may modulate the reference signal and/or control information in the at least one first set of time-frequency resources 1201 according to the first modulation scheme, wherein the first modulation scheme is capable of simultaneous transmissions of multiple independent signals.

Action 3302
The first communication node 511 may also modulate the data in the third set of time-frequency resources 1203 according to the second modulation scheme, wherein the second modulation scheme is a single carrier modulation scheme.

Action 3303
Then, the first communication node 511 may transmit the modulated reference signal and/or control information in the at least one first set of time-frequency resources 1201 and the modulated data in the third set of time-frequency resources 1203 to at least the third communication node 513.

FIG. 25 illustrates an example of actions or operations which may be taken by the first communication node 511 as part of modulating the reference signal and/or control information in the at least one first set of time-frequency resources 1201 according to the first modulation scheme, i.e. Action 3301.

Action 2501
The first communication node 511 may determine the transmission power for the third set of time-frequency resources 1203.

Action 2502
The first communication node 511 may also determine the transmission power for the at least one first set of time-frequency resources 1201.

Action 2503
Then, the first communication node 511 may compare the determined transmission power for the at least one first set of time-frequency resources 1201 and the determined transmission power for the third set of time-frequency resources 1203.

Action 2504
Based on the outcome of the comparison in Action 2503, the first communication node 511 may determine the first modulation scheme.

Action 2505
Optionally, the first communication node 511 may adjust the transmission power for the at least one first set of time-frequency resources 1201 below a determined threshold in order to avoid power saturation.

To perform the method actions herein the first communication node 511 may in the form of the wireless device 121 and the network node 110 are provided.

Figure 32:
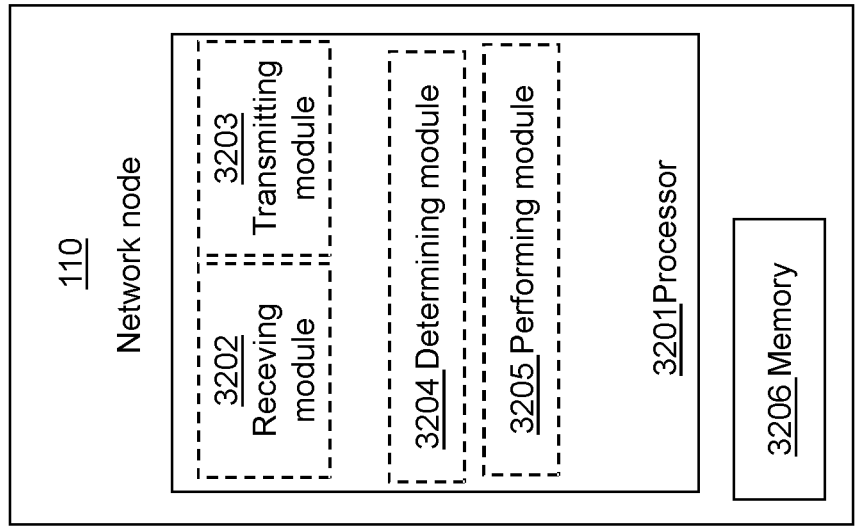
FIG. 32 is another schematic block diagram depicting an example of the first communication node, i.e. a network node.
Figure 31:
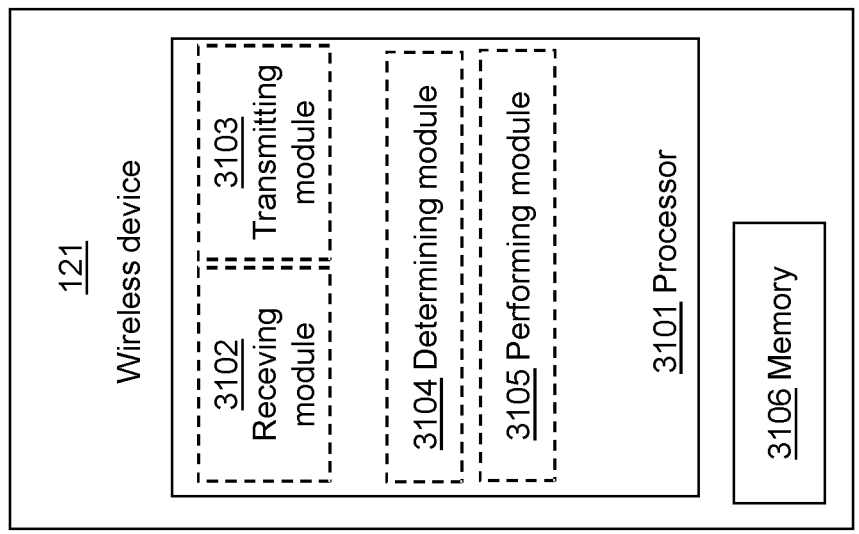
FIG. 31 is a schematic block diagram depicting an example of the first communication node, i.e. a wireless communication device.

FIGS. 31 and 32 are a block diagrams depicting the wireless device 121 and the network node 110. The wireless device 121 is configured to perform the methods described for a communication node according to embodiments herein. The network node 110 is also configured to perform the methods described for a communication node according to embodiments herein.

The embodiments herein for performing transmissions or reception in a frame 1200 of time-frequency resources in a wireless communications network 500 may be implemented through one or more processors 3101 in the wireless device 121 depicted in FIG. 33, together with computer program code for performing the functions and/or method actions of the embodiments herein. The program code mentioned above may also be provided as a computer program product, for instance in the form of a data carrier carrying computer program code for performing embodiments herein when being loaded into the wireless device 121. One such carrier may be in the form of a CD ROM disc. It is however feasible with other data carriers such as a memory stick. The computer program code may furthermore be provided as pure program code on a server and downloaded to the wireless device 121.

The wireless device 121 may comprise a receiving module 3102, or receiver RX, and a transmitting module 3103, or transmitter TX, over which the wireless device 121 may transmit/receive signals to other communication nodes, such as, e.g. the network node 110 or other wireless devices or network nodes. Also, the wireless device 121 may comprise a determining module 3104 and a performing module 3105 for performing transmissions or reception in a frame 1200 of time-frequency resources in a wireless communications network 500 according to the embodiments herein.

The wireless device 121 may further comprise a memory 3106. The memory 3106 may, for example, be used to store applications or programs to perform the methods herein and/or any information used by such applications or programs.

The embodiments herein for performing transmissions or reception in a frame 1200 of time-frequency resources in a wireless communications network 100 may be implemented through one or more processors 3201 in the network node 110 depicted in FIG. 34, together with computer program code for performing the functions and/or method actions of the embodiments herein. The program code mentioned above may also be provided as a computer program product, for instance in the form of a data carrier carrying computer program code for performing embodiments herein when being loaded into the network node 110. One such carrier may be in the form of a CD ROM disc. It is however feasible with other data carriers such as a memory stick. The computer program code may furthermore be provided as pure program code on a server and downloaded to the network node 110.

The network node 110 may comprise a receiving module 3202, or receiver RX, and a transmitting module 3203, or transmitter TX, over which the network node 110 may transmit/receive signals to other communication nodes, such as, e.g. the wireless device 121 or other wireless devices or network nodes. Also, the network node 110 may comprise a determining module 3204 and a performing module 3205 for performing transmissions or reception in a frame 1200 of time-frequency resources in a wireless communications network 500 according to the embodiments herein.

The network node 110 further comprises a memory 3206. The memory 3206 may, for example, be used to store applications or programs to perform the methods herein and/or any information used by such applications or programs. The network node 110 may further comprise an input/output interface (not shown), which may be used to communicate over a wired connection with other radio network entities or nodes in the wireless communications network 500.

The invention claimed is:

1. A method, performed by a first communication node, for performing any one of transmission and reception in at least one of: a first set of time-frequency resources in a frame of time-frequency resources, and a second set of time-frequency resources in the frame, wherein the first and the second set of time-frequency resources in the frame are reserved for communication of reference signal and/or control information in a pre-arranged direction, the direction of communication being one of: transmission and reception to or from one or more second communication nodes, the first communication node and the one or more second communication nodes operating in a communications network, and the method comprising:

determining that the direction of communication of at least one of the first and second set of time-frequency resources is to be switched, for at least one frame, to a determined switched direction; and performing one of transmission or reception of the control information in the at least one of the first and second set of time-frequency resources of the determined switched direction to or from, one or more third communication nodes operating in the communications network, wherein the at least one frame further comprises a third set of time-frequency resources used for transmission or reception of data, and wherein the method further comprises:

modulating the reference signal and/or control information, in at least one of the first set of time-frequency resources and the second set of time-frequency resources, according to a first modulation scheme, wherein the first modulation scheme is capable of simultaneous transmissions of multiple independent signals;

modulating the data, in the third set of time-frequency resources, according to a second modulation scheme, wherein the second modulation scheme is a different modulation scheme than the first modulation scheme; and transmitting a) the modulated reference signal and/or control information in the one of: the first set of time-frequency resources and the second set of time-frequency resources, the direction of communication of which resource is not to be switched, and b) the modulated data in the third set of time-frequency resources to at least one second communication node of the one or more second communication nodes, wherein the performing of one of transmission or reception of control information comprises transmission of the modulated reference signal and/or control information in the at least one of the first set of time-frequency resources and the second set of time-frequency resources to the one or more third communication nodes operating in the communications network.

2. The method of claim 1, wherein the determined switched direction corresponds to a pattern.

3. The method of claim 1, wherein the determined switched direction is one of:
a pre-agreed direction with the one or more second communication nodes; or
an autonomously determined switched direction.

4. The method of claim 1, wherein the set of time-frequency resources determined to switch communication direction is determined based on one of:
pseudo-random;
prearranged; or
a current time.

5. The method of claim 1,
wherein the method further comprises determining that the second set of time-frequency resources is a subset of time-frequency resources in the third set of time-frequency resources; and wherein the subset of time-frequency resources comprises reference signal and/or control information to be transmitted or received in the same direction as the data in time-frequency resources in the third set of time-frequency resources.

6. The method of claim 5, wherein the performing comprises performing transmission or reception of the reference signal and/or control information in at least one subset of the first set of time-frequency resources and/or the subset of time-frequency resources in the third set of time-frequency resources to or from the one or more third communication nodes.

7. The method of claim 5,
wherein the reference signal and/or control information in the subset of time-frequency resources in the third set of time-frequency resources is modulated using one of:
a) a different modulation scheme than the data in the time-frequency resources in the third set of time-frequency resources; and
b) the same modulation scheme as the control information in the first set of time-frequency resources; and
wherein the used modulation scheme is one of:
a multi-carrier modulation scheme; or
a single-carrier modulation scheme.

8. The method of claim 5, wherein the subset of time-frequency resources in the third set of time-frequency resources corresponds to the first occurring time-frequency resources in the third set of time-frequency resources.

9. The method of claim 5, wherein the second set of the time-frequency resources in the frame corresponds to the last occurring time-frequency resources in the frame.

10. The method of claim 1, wherein the modulating the reference signal and/or control information in at least one of the first set of time-frequency resources and the second set of time-frequency resources, according to the first modulation scheme, comprises:
determining a transmission power for the third set of time-frequency resources;
determining a transmission power for the at least one of the first set of time-frequency resources and the second set of time-frequency resources;
comparing the determined transmission power for the at least one of the first set of time-frequency resources and the second set of time-frequency resources, and the determined transmission power for the third set of time-frequency resources; and
determining the first modulation scheme based on the outcome of the comparison.

11. The method of claim 10, wherein the modulating the reference signal and/or control information in at least one of the first set of time-frequency resources and the second set of time-frequency resources, according to the first modulation scheme, further comprises adjusting the transmission power for the at least one first set of time-frequency resources and the second set of time-frequency resources below a determined threshold in order to reduce power saturation.

12. The method of claim 1, wherein the modulating comprises providing a more robust channel coding in the first modulation scheme than provided in the second modulation scheme.

13. The method of claim 1, wherein the first communication node is a wireless device or a network node in the communications network.

14. A non-transitory computer readable recording medium storing a computer program product for performing, by a first communication node, any one of transmission and reception in at least one of: a first set of time-frequency resources in a frame of time-frequency resources, and a second set of time-frequency resources in the frame, wherein the first and the second set of time-frequency resources in the frame are reserved for communication of reference signal and/or control information in a pre-arranged direction, the direction of communication being one of: transmission and reception to or from one or more second communication nodes, the first communication node and the one or more second communication nodes operating in a communications network, the computer program product comprising software instructions which, when run on processing circuitry of the first communication node, cause the first communication node to:
determine that the direction of communication of at least one of the first and second set of time-frequency resources is to be switched, for at least one frame, to a determined switched direction; and
perform one of transmission or reception of the control information in the at least one of the first and second set of time-frequency resources of the determined switched direction to or from, one or more third communication nodes operating in the communications network,
wherein the at least one frame further comprises a third set of time-frequency resources used for transmission or reception of data, and wherein the software instructions further cause the first communication node to:
modulate the reference signal and/or control information, in at least one of the first set of time-frequency resources and the second set of time-frequency resources, according to a first modulation scheme, wherein the first modulation scheme is capable of simultaneous transmissions of multiple independent signals;
modulate the data, in the third set of time-frequency resources, according to a second modulation scheme, wherein the second modulation scheme is a different modulation scheme than the first modulation scheme; and
transmit a) the modulated reference signal and/or control information in the one of: the first set of time-frequency resources and the second set of time-frequency resources, the direction of communication of which resource is not to be switched, and b) the modulated data in the third set of time-frequency resources to at least one second communication node of the one or more second communication nodes,
wherein to perform one of transmission or reception of the control information, the software instructions cause the first communication node to transmit the modulated reference signal and/or control information in the at least one of the first set of time-frequency resources and the second set of time-frequency resources to the one or more third communication nodes operating in the communications network.

15. A first communication node configured to perform any one of transmission and reception in at least one of: a first set of time-frequency resources in a frame of time-frequency resources, and a second set of time-frequency resources in the frame, wherein the first and the second set of time-frequency resources in the frame are reserved for communication of reference signal and/or control information in a pre-arranged direction, the direction of communication being one of: transmission and reception to or from one or more second communication nodes, the first communication node and the one or more second communication nodes being configured to operate in a communications network, and the first communication node comprising:
  processing circuitry; and
  memory containing instructions executable by the processing circuitry whereby the first communication node is operative to:
    determine that the direction of communication of at least one of the first and second set of time-frequency resources is to be switched, for at least one frame to a determined switched direction, and
    perform one of transmission or reception of the control information in the at least one of the first and second set of time-frequency resources of the determined switched direction to or from, one or more third communication nodes configured to operate in the communications network,
  wherein the at least one frame further comprises a third set of time-frequency resources used for transmission or reception of data, and wherein the instructions are such that the first communication node is operative to:
    modulate the reference signal and/or control information, in at least one of the first set of time-frequency resources and the second set of time-frequency resources, according to a first modulation scheme, wherein the first modulation scheme is capable of simultaneous transmissions of multiple independent signals;
    modulate the data, in the third set of time-frequency resources, according to a second modulation scheme, wherein the second modulation scheme is a different modulation scheme than the first modulation scheme; and
    transmit a) the modulated reference signal and/or control information in the one of: the first set of time-frequency resources and the second set of time-frequency resources, the direction of communication of which resource is not to be switched, and b) the modulated data in the third set of time-frequency resources to at least one second communication node of the one or more second communication nodes,
  wherein to perform one of transmission or reception of the control information, the first communication node is operative to transmit the modulated reference signal and/or control information in the at least one of the first set of time-frequency resources and the second set of time-frequency resources to the one or more third communication nodes configured to operate in the communications network.

16. The first communication node of claim 15, wherein the determined switched direction corresponds to a pattern.

17. The first communication node of claim 15, wherein the determined switched direction is one of:
  a pre-agreed direction with the one or more second communication nodes; or
  an autonomously determined switched direction.

18. The first communication node of claim 15, wherein the instructions are such that the first communication node is operative to determine the set of time-frequency resources to switch communication direction based on one of:
  pseudo-random;
  prearranged; or
  a current time.

19. The first communication node of claim 15,
  wherein the instructions are such that the first communication node is operative to determine that the second set of time-frequency resources is a subset of time-frequency resources in the third set of time-frequency resources; and
  wherein the subset of time-frequency resources comprises reference signal and/or control information to be transmitted or received in the same direction as the data in time-frequency resources in the third set of time-frequency resources.

20. The first communication node of claim 19, wherein the instructions are such that the first communication node is operative to perform the one of transmission or reception of the control information by performing transmission or reception of the reference signal and/or control information in at least one subset of the first set of time-frequency resources and/or the subset of time-frequency resources in the third set of time-frequency resources to or from the one or more third communication nodes.

21. The first communication node of claim 19,
  wherein the reference signal and/or control information in the subset of time-frequency resources in the third set of time-frequency resources is configured to be modulated using one of:
    a) a different modulation scheme than the data in the time-frequency resources in the third set of time-frequency resources; and
    b) the same modulation scheme as the control information in the first set of time-frequency resources; and
  wherein the used modulation scheme is one of:
    a multi-carrier modulation scheme; or
    a single-carrier modulation scheme.

22. The first communication node of claim 19, wherein the subset of time-frequency resources in the third set of time-frequency resources corresponds to the first occurring time-frequency resources in the third set of time-frequency resources.

23. The first communication node of claim 19, wherein the second set of the time-frequency resources in the frame corresponds to the last occurring time-frequency resources in the frame.

24. The first communication node of claim 15, wherein to modulate the reference signal and/or control information in the at least one of the first set of time-frequency resources and the second set of time-frequency resources, according to the first modulation scheme, the first communication node is operative to:
  determine a transmission power for the third set of time-frequency resources;
  determine a transmission power for the at least one of the first set of time-frequency resources and the second set of time-frequency resources;
  compare the determined transmission power for the at least one of the first set of time-frequency resources and the second set of time-frequency resources, and the determined transmission power for the third set of time-frequency resources; and
  determine the first modulation scheme based on the outcome of the comparison.

25. The first communication node of claim 24, wherein to modulate the reference signal and/or control information in the at least one of the first set of time-frequency resources and the second set of time-frequency resources, according to the first modulation scheme, the first communication node is operative to adjust the transmission power for the at least one first set of time-frequency resources and the second set of time-frequency resources below a determined threshold in order to reduce power saturation.

26. The first communication node of claim 15, wherein to modulate, the first communication node is operative to provide a more robust channel coding in the first modulation scheme than provided in the second modulation scheme.

27. The first communication node of claim 15, wherein the first communication node is a wireless device or a network node in the communications network.

* * * * *